(12) United States Patent
Yamamoto et al.

(10) Patent No.: US 8,678,360 B2
(45) Date of Patent: Mar. 25, 2014

(54) LIQUID-SEALED TYPE VIBRATION ISOLATOR

(75) Inventors: Kentaro Yamamoto, Osaka (JP); Takahiro Ohguchi, Osaka (JP); Gen Isawa, Osaka (JP); Kengo Hase, Osaka (JP); Norimitsu Furusawa, Osaka (JP); Katsuhiro Sakurai, Aichi (JP)

(73) Assignees: Toyo Tire & Rubber Co., Ltd., Osaka-shi, Osaka (JP); Toyota Jidosha Kabushiki Kaisha, Toyota-shi (JP)

( * ) Notice: Subject to any disclaimer, the term of this patent is extended or adjusted under 35 U.S.C. 154(b) by 269 days.

(21) Appl. No.: 13/063,651

(22) PCT Filed: Mar. 13, 2009

(86) PCT No.: PCT/JP2009/001143
§ 371 (c)(1),
(2), (4) Date: May 5, 2011

(87) PCT Pub. No.: WO2010/032344
PCT Pub. Date: Mar. 25, 2010

(65) Prior Publication Data
US 2011/0210488 A1 Sep. 1, 2011

(30) Foreign Application Priority Data

Sep. 17, 2008 (JP) ................................. 2008-238406
Sep. 17, 2008 (JP) ................................. 2008-238410
Sep. 17, 2008 (JP) ................................. 2008-238414
Sep. 22, 2008 (JP) ................................. 2008-242810

(51) Int. Cl.
*F16F 13/00* (2006.01)
(52) U.S. Cl.
USPC .................................................. 267/140.13
(58) Field of Classification Search
USPC ........................................ 267/140.11–140.13
See application file for complete search history.

(56) References Cited

U.S. PATENT DOCUMENTS 5,240,233 A 8/1993 Kato et al.
5,273,262 A 12/1993 Baldini et al.
(Continued)

FOREIGN PATENT DOCUMENTS

CN 1662755 A 8/2005
JP 61-144443 A 7/1986
(Continued)

OTHER PUBLICATIONS

Japanese Office Action dated May 29, 2012, issued in corresponding Japanese Patent Application No. 2008-238410, with English translation (4 pages).

(Continued)

*Primary Examiner* — Christopher Schwartz
(74) *Attorney, Agent, or Firm* — Westerman, Hattori, Daniels & Adrian, LLP

(57) ABSTRACT

In a liquid-sealed type vibration isolator having a first orifice flow channel 56 and a second orifice flow channel 60, a valve member 66 formed of a rubber elastomeric membrane for opening and closing the second orifice flow channel 60 is provided on a partitioning member 40 so as to be orthogonal to the direction of flow in the second orifice flow channel. The valve member is held at the outer peripheral portion thereof by a wall surface of a valve housing chamber 68, and includes inside the outer peripheral portion thereof a membrane portion 66B which is subjected to the flexural deformation by the liquid flow in the second orifice flow channel to close openings 60C and 60D of the second orifice flow channel. Communicating holes 76 which bring the second orifice flow channel into communication are provided at positions not overlapped with the opening of the membrane portion 66B. Accordingly, the switching of characteristics is enabled with an inexpensive structure.

19 Claims, 17 Drawing Sheets

(56) References Cited

U.S. PATENT DOCUMENTS

| | | | |
|---|---|---|---|
| 6,158,724 | A | 12/2000 | Takashima et al. |
| 6,224,045 | B1 | 5/2001 | Muramatsu et al. |
| 6,439,554 | B1 | 8/2002 | Takashima et al. |
| 6,708,963 | B2 * | 3/2004 | Nishi et al. ............... 267/140.14 |
| 7,334,783 | B2 | 2/2008 | Yoneyama et al. |
| 7,648,129 | B2 * | 1/2010 | Muraoka ................. 267/140.13 |
| 7,857,293 | B2 * | 12/2010 | Muraoka ................. 267/140.11 |
| 8,132,796 | B2 * | 3/2012 | Muraoka ................. 267/140.14 |
| 2005/0056980 | A1 | 3/2005 | Kuzukawa |
| 2005/0127586 | A1 * | 6/2005 | Maeno et al. ............ 267/140.13 |
| 2005/0218570 | A1 | 10/2005 | Ueki |
| 2005/0258581 | A1 * | 11/2005 | Tanaka ..................... 267/140.11 |
| 2006/0006593 | A1 * | 1/2006 | Bretaudeau et al. ..... 267/140.14 |
| 2006/0097435 | A1 | 5/2006 | Yoneyama et al. |
| 2006/0097436 | A1 | 5/2006 | Yamamoto |
| 2006/0249891 | A1 | 11/2006 | Ueki et al. |
| 2007/0013115 | A1 * | 1/2007 | Katagiri et al. .......... 267/140.13 |
| 2007/0085249 | A1 | 4/2007 | Happou et al. |
| 2007/0138718 | A1 * | 6/2007 | Muraoka ................. 267/140.14 |
| 2008/0023897 | A1 | 1/2008 | Muraoka |
| 2010/0072683 | A1 | 3/2010 | Saito et al. |
| 2011/0210488 | A1 | 9/2011 | Yamamoto et al. |
| 2012/0074629 | A1 | 3/2012 | Yamamoto et al. |
| 2012/0228813 | A1 * | 9/2012 | Masuda et al. .......... 267/140.13 |
| 2012/0248669 | A1 * | 10/2012 | Masuda et al. .......... 267/140.13 |
| 2012/0292838 | A1 | 11/2012 | Yamamoto et al. |

FOREIGN PATENT DOCUMENTS

| | | |
|---|---|---|
| JP | 63-203940 A | 8/1988 |
| JP | 6-307491 A | 11/1994 |
| JP | 2000-337428 A | 12/2000 |
| JP | 2002-372091 A | 12/2002 |
| JP | 2004-003614 A | 1/2004 |
| JP | 2005-113954 A | 4/2005 |
| JP | 2006-38017 A | 2/2006 |
| JP | 2006-57727 A | 3/2006 |
| JP | 2007-046777 A | 2/2007 |
| JP | 2007-051713 A | 3/2007 |
| JP | 2007-92778 A | 4/2007 |
| JP | 2007-107712 A | 4/2007 |
| JP | 2007-177973 A | 7/2007 |
| JP | 2007-177975 A | 7/2007 |
| JP | 2008-051214 A | 3/2008 |
| JP | 2008-69905 A | 3/2008 |
| JP | 2008-138854 A | 6/2008 |

OTHER PUBLICATIONS

Japanese Office Action dated May 29, 2012, issued in corresponding Japanese Patent Application No. 2008-238406, with English translation (4 pages).

Japanese Office Action dated May 29, 2012, issued in corresponding Japanese Patent Application No. 2008-242810, with English translation (4 pages).

English abstract with Machine translation only of JP2007-051713 previously submitted on Mar. 11, 2011, Cited in Japanese Office Actions dated May 29, 2012.

English abstract with Machine translation only of JP06-307491 previously submitted on Mar. 11, 2011, Cited in Japanese Office Actions dated May 29, 2012.

English abstract with Machine translation only of JP2008-138854 previously submitted on Mar. 11, 2011, Cited in Japanese Office Actions dated May 29, 2012.

English abstract with Machine translation only of JP2005-113954 previously submitted on Mar. 11, 2011, Cited in Japanese Office Actions dated May 29, 2012 (Patent Application Nos. 2008-238406 and 2008-238410).

Chinese Office Action dated Dec. 17, 2012, issued in corresponding Chinese patent application No. 200980136015.8, w/ English translation.

International Search Report of PCT/JP2009/001143, date of mailing Jun. 16, 2009.

US Office Action dated Jun. 26, 2013, issued in U.S. Appl. No. 13/258,937.

International Search Report of PCT/JP2010/000147, date of mailing Feb. 9, 2010.

Japanese Office Action dated May 15, 2012, issued in corresponding Japanese Patent Application No. 2009-100142, with English translation (4 pages).

Chinese Office Action dated Mar. 25, 2013, issued in corresponding Chinese Patent Application No. 201080017162.6, with English translation (8 pages).

Final Office Action dated Jan. 16, 2014, issued in corresponding U.S. Appl. No. 13/258,937.

\* cited by examiner (a)

(b)

(c)

(a)

(b)

(a)

(b)

(a)

(b)

LIQUID-SEALED TYPE VIBRATION ISOLATOR

TECHNICAL FIELD

The present invention relates to a liquid-sealed type vibration isolator.

BACKGROUND ART

As a known vibration isolator such as an engine mount which supports a vibration source such as a vehicle engine or the like so as not to transmit vibrations to a vehicle body side, there is a liquid-sealed type vibration isolator including a first fixture to be fixed to a vibration source side, a second fixture to be fixed to a support side, a vibration-isolating base member provided between these fixtures and made of elastomer, a main liquid chamber having a chamber wall formed partly of the vibration-isolating base member, an auxiliary liquid chamber having a chamber wall formed partly of a diaphragm, and an orifice flow channel configured to communicate these liquid chambers, and configured to carry out a vibration damping function and a vibration insulating function by a liquid flow effect due to the orifice flow channel or by a vibration control effect due to the vibration-isolating base member.

As the liquid-sealed type vibration isolator of this type, there is proposed a type which is provided with a plurality of orifice flow channels which are tuned to different frequencies for accommodating vibrations in a wide range of frequencies, so that the orifice flow channel can be switched.

For example, Patent Document 1 shown below discloses a switchable liquid-sealed type vibration isolator which is configured to be capable of closing a opening of a high-frequency side orifice flow channel using urging means such as a spring. In this document, a negative pressure is used for releasing the opening from the closed state. In other words, a switching chamber which allows selective introduction of an atmospheric pressure and a negative pressure is provided behind the diaphragm, so that the high-frequency side orifice flow channel is brought into a closed state by the urging means by introducing the atmospheric air into the switching chamber, and the high-frequency side orifice flow channel is brought into an opened state by introducing the negative pressure into the switching chamber.

Patent Document 2 shown below discloses a configuration in which a sliding member, so-called a plunger, is provided on a partitioning member between the main liquid chamber and the auxiliary liquid chamber, the plunger is urged by the spring to make the high-frequency side orifice flow channel in the opened state, and the plunger is moved upward and downward by the pressure difference between the both liquid chambers to switch the high-frequency side orifice flow channel between the opened state and the closed state.

Patent Document 3 shown below discloses a configuration in which the high-frequency side orifice flow channel is formed inside an upper fixture, and a second auxiliary liquid chamber is provided upward thereof, a movable membrane is arranged in the second auxiliary liquid chamber, and opening and closing of the high-frequency side orifice flow channel is achieved by the upward and downward movement of the movable membrane.

Patent Document 4 shown below discloses a configuration in which a connecting flow channel which communicates the main liquid chamber and the auxiliary liquid chamber is closed using the urging means such as a leaf spring on the partitioning member on the side of the main liquid chamber. However, according to this document, the connecting flow channel is opened when the interior of the main liquid chamber reaches a pressure equal to or below a predetermined value by an input of impulsive heavy-load vibrations, whereby liquid is leaked from the auxiliary liquid chamber to the main liquid chamber to restrain cavitation, but it is not configured to switch the orifice flow channels tuned into different frequencies.

Patent Document 5 shown below discloses points such that a movable membrane that partitions between the main liquid chamber and an intermediate chamber is configured with a panel-shaped member formed of a rubber elastomer, an elastic deformation of the movable membrane in the panel thickness direction is provided with non-linear spring characteristics to cause the movable membrane to be deformed in an area having low-spring characteristics when idling vibrations are input, and to be deformed up to an area having high-spring characteristics when vibrations having amplitudes larger than the idling vibrations are input in an area having frequencies higher than a resonance frequency of a first orifice flow channel. However, according to this document, it is only means to provide the movable membrane with rigidity depending on the amplitude and improve a damping performance in a large amplitude range, but opening and closing operations of a second orifice flow channel are not performed.

Patent Document 1: Japanese Patent No. 3663482
Patent Document 2: JP-A-2004-003614
Patent Document 3: JP-A-2008-051214
Patent Document 4: JP-A-2007-107712
Patent Document 5: JP-A-2007-046777

DISCLOSURE OF INVENTION

Problems to be Solved by the Invention

In the configuration of Patent Document 1 described above, it is necessary to provide the switching chamber, and hence the vibration isolator is upsized. Also, it is necessary to provide the spring as urging means and the diaphragm for forming the switching chamber separately, so that the cost increase is involved.

In the configuration of Patent Document 2 described above, the plunger is slid by the pressure difference between the main liquid chamber and the auxiliary liquid chamber, a frequency to close the high-frequency side orifice flow channel needs to be a relatively high frequency. In other words, in this case, the plunger is not slid by a liquid flow in the high-frequency side orifice flow channel, but by the pressure difference between the main liquid chamber and the auxiliary liquid chamber. When the pressure difference is used, a frequency band which urges the operation is higher than that in a case where the liquid flow is used. Therefore, it is slow to respond, and hence the effect of damping shaking vibrations at low frequencies is not good. Also, according to the configuration of this document, dimensional accuracy of members is required for ensuring the sliding movement of the plunger, so that the cost increase is significant.

According to the configuration in Patent Document 3, since the movable membrane does not have restoring means. Therefore, the position of the movable membrane is subjected to the gravitational force, and hence positional stability is not sufficient and the reliability of the switching action is not sufficient.

In view of points described above, it is an object of the present invention to provide a liquid-sealed type vibration isolator having a plurality of orifice flow channels which allows switching of characteristics with an inexpensive structure.

Means for Solving the Problems

A liquid-sealed type vibration isolator according to the present invention includes: a first fixture to be fixed to one of a vibration source side and a support side; a second fixture to be fixed to the other one of the vibration source side and the support side; a vibration-isolating base member made of an elastomer interposed between the first fixture and the second fixture; a main liquid chamber having liquid sealed therein and a chamber wall thereof defined partly of the vibration-isolating base member; at least one auxiliary liquid chamber having liquid sealed therein and a chamber wall thereof defined partly of a diaphragm formed of an elastomeric membrane; a first orifice flow channel configured to communicate the main liquid chamber and either one of the auxiliary liquid chambers; a second orifice flow channel tuned to a higher frequency range than the first orifice flow channel and configured to communicate any two of the main liquid chamber and the auxiliary liquid chambers; a partitioning member configured to partition the main liquid chamber and any one of the auxiliary liquid chambers and formed with the second orifice flow channel; and a valve member formed of an elastomeric membrane for opening and closing the second orifice flow channel. The partitioning member includes a valve housing chamber configured to house and hold the valve member in a part of the second orifice flow channel so as to be orthogonal to the direction of flow in the flow channel. The valve member is held at an outer peripheral portion thereof between wall surfaces of the valve housing chamber, and includes inside the outer peripheral portion thereof a flexible membrane portion configured to be subjected to flexural deformation by the liquid flow in the second orifice flow channel and thereby close an opening of the second orifice flow channel to the valve housing chamber provided in the partitioning member. The membrane portion includes a communication hole configured to bring the second orifice flow channel into communication at a position not being overlapped with the opening of the partitioning member to open the second orifice flow channel in a state in which the membrane portion is apart from the opening.

With the liquid-sealed type vibration isolator as described above, if the amplitude of the input is relatively small, the second orifice flow channel is not closed by the valve member, and hence the liquid in the second orifice flow channel can be moved back and forth between the liquid chambers through the communication holes provided on the valve member. Therefore, realization of characteristics utilizing the high-frequency side second orifice flow channel is achieved. In contrast, if the amplitude of the input is relatively large, the liquid flow in the second orifice flow channel is increased, so that the valve member is subjected to the flexural deformation, and the high-frequency side second orifice flow channel is closed. Accordingly, the liquid is moved back and forth between the liquid chambers only via the low-frequency side first orifice flow channel, a high damping performance can be secured on the low-frequency side.

Also, since it is configured to close the second orifice flow channel by the flexural deformation of the valve member formed of the elastomeric membrane, if the liquid flow to the valve member is reduced, the second orifice flow channel can be restored to the opened state by a restoration force that the valve member has. Therefore, urging means such as a spring or a switching chamber for a negative pressure is not necessary, so that the downsizing of the apparatus or the cost reduction is easily achieved.

In the liquid-sealed type vibration isolator described above, a configuration in which the membrane portion includes a projection provided on a membrane surface of the membrane portion at a position not being overlapped with the opening of the partitioning member, and the projection is configured to be compressed to an opposed wall surface of the valve housing chamber by the flexural deformation of the membrane portion is also applicable. With the provision of the projection on the membrane portion of the valve member, the restoration force after the flexural deformation of the valve member can be increased. Therefore, the restoration of the valve member after the flexural deformation can further be ensured, and the second orifice flow channel can reliably be brought into an opened state. At the time of the flexural deformation of the valve member, the contact area between the valve member and the wall surface of the partitioning member with the second orifice flow channel closed can be reduced by restraining the displacement of the membrane portion in the periphery of the projection, whereby an effect of reduction of the abnormal sound is achieved.

In this case, the communication holes may be provided at a plurality of positions on a circumference surrounding a plug portion at the center of the membrane portion, and the projections may be provided at a plurality of positions on the circumference alternately with the communication holes. With the provision of the plurality of communication holes and the projections alternately on the circumference, the restoration force of the valve member after the flexural deformation is enhanced, and the superior effect of reducing the abnormal sound is achieved.

In the liquid-sealed type vibration isolator described above, an annular projecting portion may be provided on a peripheral edge portion of the opening of the partitioning member or on the membrane portion opposing the peripheral edge portion so as to surround the opening. With the provision of the annular projecting portion as described above, the clearance between the valve member and the opening of the second orifice flow channel to be closed thereby can be adjusted easily, and the adjustment of the range (input amplitude, etc.) in which the second orifice flow channel is closed can be adjusted easily. Also, with the provision of the annular projecting portion, a stroke of the membrane portion of the valve member until it closes the opening of the second orifice flow channel becomes smaller, and hence the impact applied at the time of contact can be alleviated. At the same time, with the presence of the annular projecting portion, the contact area between the valve member and the wall surface of the valve housing chamber is reduced, so that the lowering of the abnormal sound level is also enabled.

In this case, the annular projecting portion may be provided on the membrane portion and a radially projecting portion extending from the center of the annular projecting portion in the radial direction may be provided inside the annular projecting portion. With the combination of the annular projecting portion and the radially projecting portion, a problem such that the membrane portion of the valve member is adsorbed to the partitioning member when the second orifice flow channel is closed, and hence can hardly return to the restored position can be avoided.

In the liquid-sealed type vibration isolator described above, the second orifice flow channel may be provided so as to communicate the main liquid chamber and any one of the auxiliary liquid chambers. Also, a configuration in which the auxiliary liquid chambers include a first auxiliary liquid chamber which includes a chamber wall defined partly by a first diaphragm attached to the second fixture, and a second auxiliary liquid chamber having a chamber wall defined partly by a second diaphragm provided on the partitioning member, the partitioning member partitions the main liquid chamber and the first auxiliary liquid chamber, the first orifice flow channel is provided so as to communicate the main liquid chamber and the first auxiliary liquid chamber, and the second orifice flow channel is provided so as to communicate the second auxiliary liquid chamber and the main liquid chamber or the first auxiliary liquid chamber is also applicable.

In this case, a configuration in which the second auxiliary liquid chamber is provided at the center of the partitioning member, the second orifice flow channel includes a first flow channel portion extending in the thickness direction of the partitioning member and a second flow channel portion connected to the first flow channel portion and extending along the periphery of the second auxiliary liquid chamber, the partitioning member includes the valve housing chamber at an intermediary position of the first flow channel portion so as to be orthogonal to the direction of flow in the flow channel portion, and the valve member is arranged so that the center thereof is deviated from the center of the second auxiliary liquid chamber so that the first flow channel portion is not overlapped with the second auxiliary liquid chamber in the thickness direction of the partitioning member is also applicable. Since the first flow channel portion of the second orifice flow channel which is opened and closed by the valve member is provided so as not to be overlapped with the second auxiliary liquid chamber in the direction of the thickness of the partitioning member with the centers of the valve member and the second auxiliary liquid chamber deviated from each other after providing the second auxiliary liquid chamber at the center of the partitioning member, the first flow channel portion can be connected as-is to the second flow channel portion around the second auxiliary liquid chamber. Therefore, a certain length of the second orifice flow channel can be secured while restraining the thickness of the partitioning member to be small.

In this case, a configuration in which the partitioning member is formed into a circular shape in plan view, the valve member is formed into a disk shape, and the valve member is arranged so that the center thereof is deviated from the center of the partitioning member by an extent corresponding to a radius of the valve member or more is also applicable. By arranging the valve member at a position offset from the center of the partitioning member, the above-described configuration in which the first flow channel portion is not overlapped with the second auxiliary liquid chamber is easily achieved.

In the liquid-sealed type vibration isolator, non-uniformizing means configured to bring the flexural deformation of the membrane portion into a non-uniform state over the circumference thereof may be provided. As the non-uniformizing means, for example, (1) A configuration in which the opening of the partitioning member opposing a membrane surface of at least one of the front and back of the membrane portion is deviated from the center of the valve member,
(2) A configuration in which the rigidity of the membrane portion is set to be non-uniform over a circumference surrounding the plug portion positioned at the center of the membrane portion, and
(3) A configuration in which flexural deformation restricting projections configured to restrict the flexural deformation by coming into abutment with the membrane portion at least at the time of the flexural deformation of the membrane portion are provided on a wall surface of the valve housing chamber opposing at least one of the membrane surfaces on the front and back sides of the membrane portion non-uniformly on the circumference, are exemplified.

According to the configuration in (1) described above, by arranging the opening of the second orifice flow channel which flows into the valve member is offset with respect to the center of the valve member, the flexural deformation of the valve member is generated from a position offset from the center of the valve member as a starting point. Therefore, the contact to the wall surface of the opposed valve housing chamber can be decentralized to non-uniform timings over the circumference, so that the abnormal sound level caused by the contact may be reduced.

According to the configuration as described in (2), since the rigidity of the valve member is made to be non-uniform over the circumference, the contact to the wall surface of the opposed valve housing chamber may be made to be the non-uniform state over the circumference at the time of the flexural deformation, so that the lowering of the abnormal sound level caused by the contact is achieved in the same manner as in (1) described above. In this case, as the means for setting the rigidity of the membrane portion to be non-uniform over the circumference, a configuration in which the communication holes provided on the membrane portion are arranged at non-uniform intervals at a plurality of positions on the circumference surrounding the plug portion is also applicable. Also, a configuration in which the projections configured to be compressed to the opposed wall surface of the valve housing chamber by the flexural deformation of the membrane portion are provided on the membrane surface of the membrane portion at positions not being overlapped with the opening of the partitioning member, and then the projections are arranged at non-uniform intervals at a plurality of positions on the circumference surrounding the plug portion.

According to the configuration as described in (3), since the flexural deformation restricting projections configured to restrict the flexural deformation of the valve member are provided on the wall surface of the valve housing chamber non-uniformly over the circumference, the contact to the wall surface of the valve housing chamber may be made to be the non-uniform state over the circumference at the time of the flexural deformation of the valve member, so that the lowering of the abnormal sound level caused by the contact is achieved in the same manner as in (1) described above.

In the liquid-sealed type vibration isolator, a configuration in which the outer peripheral portion of the valve member is formed to be thicker than the membrane portion, and a ring-shaped restricting projection configured to come into abutment with the inner peripheral surface of the thick outer peripheral portion and restrict inward displacement of the outer peripheral portion is provided on the wall surface of the valve housing chamber is also applicable. Accordingly, the valve member can hardly be displaced radially inwardly when it is subjected to the flexural deformation, so that the performance can be maintained.

Advantages of the Invention

According to the present invention, in the liquid-sealed type vibration isolator having a plurality of orifice channels, the characteristics can effectively be switched without providing urging means such as a spring or a switching chamber for a negative pressure, so that the liquid-sealed type vibration

Figure 1:
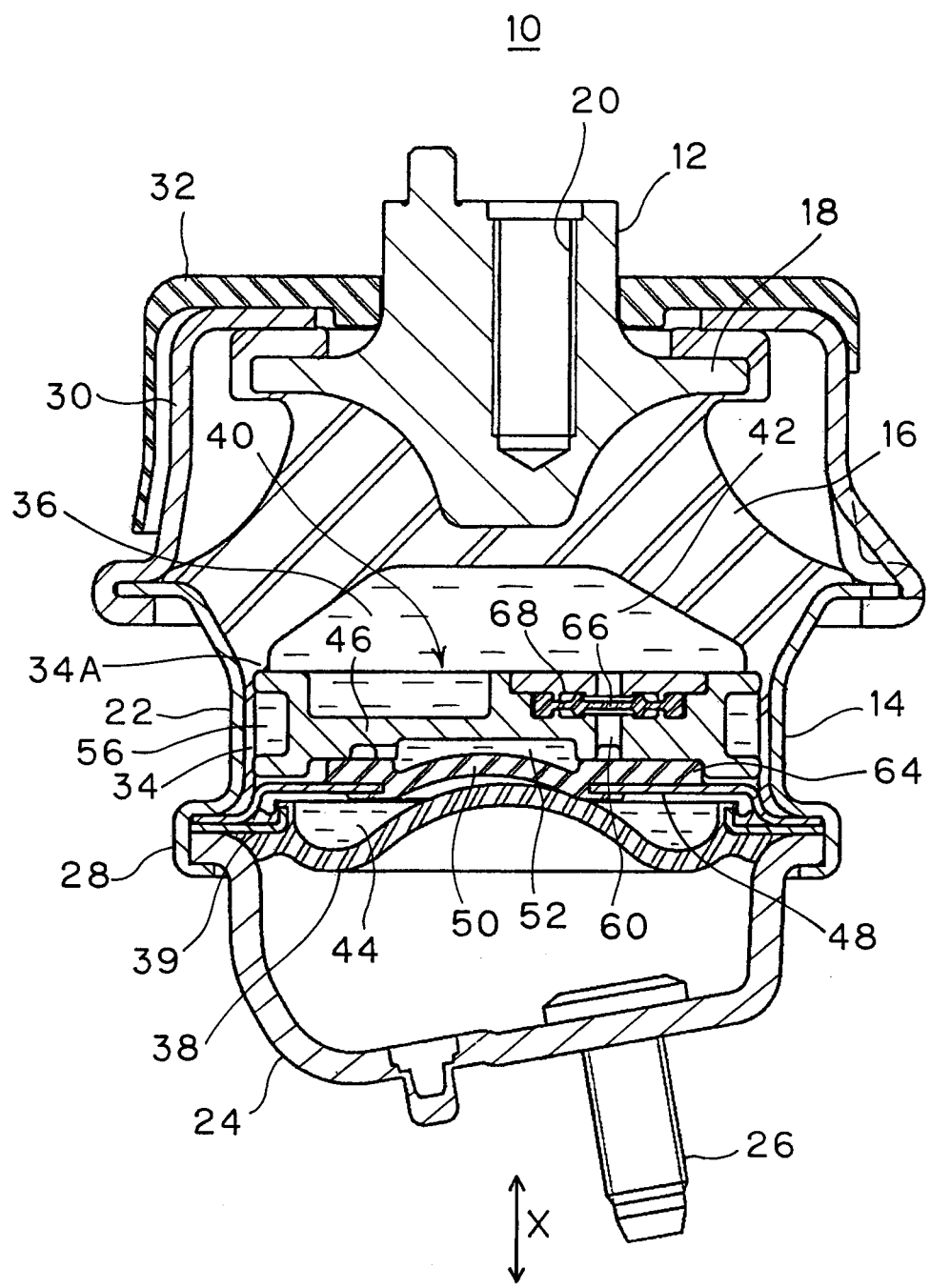
FIG. 1 is a vertical cross-sectional view of a liquid-sealed type vibration isolator according to a first embodiment.

REFERENCE NUMERALS 10,10A . . . liquid-sealed type vibration isolator,
12 . . . first fixture, 14 . . . second fixture, 16 . . . vibration-isolating base member, 38 . . . first diaphragm,
40 . . . partitioning member, 42 . . . main liquid chamber, 44 . . . first auxiliary liquid chamber,
50 . . . second diaphragm, 52 . . . second auxiliary liquid chamber, 56 . . . first orifice flow channel,
60 . . . second orifice flow channel, 60A . . . first flow channel portion, 60B . . . second flow channel portion, 60C, 60D . . . opening,
66 . . . valve member, 66A . . . outer peripheral portion, 66B . . . membrane portion, 66C . . . plug portion,
68 . . . valve housing chamber, 68A, 68B . . . wall surface,
76 . . . communicating hole, 78 . . . projection, 80 . . . restricting projection,
82, 84 . . . annular projecting portion, 86 . . . radially projecting portion, 88 . . . flexural deformation restricting projection,
$O_P$ . . . center of partitioning member, $O_L$ . . . center of second auxiliary liquid chamber, $O_V$ . . . center of valve member, Oa . . . center of opening of partitioning member

BEST MODES FOR CARRYING OUT THE INVENTION

Referring now to the drawings, embodiments of the present invention will be described.

First Embodiment

FIG. 1 is a vertical cross-sectional view of a liquid-sealed type vibration isolator 10 according to an embodiment. The vibration isolator 10 is an engine mount configured to support an engine of an automotive vehicle, and includes an upper first fixture 12 to be fixed to the side of the engine, which is a vibration source, a lower second fixture 14 formed into a cylindrical shape and fixed to a vehicle body on the support side, and a vibration-isolating base member 16 made of a rubber elastomer configured to connect the both fixtures 12, 14 by being interposed therebetween.

The first fixture 12 is a boss metal fitting arranged at an upper portion of the axial center of the second fixture 14 and is formed with a stopper portion 18 projecting radially outwardly in a flange shape. A bolt hole 20 is provided in an upper end portion, so as to be fixable to the engine side via a bolt, not shown.

The second fixture 14 includes a cylindrical attachment 22 in which a vibration-isolating base member 16 is formed by vulcanizing molding, and a cup-shaped bottom attachment 24. The second fixture 14 is formed with a mounting bolt 26 projecting downward at a center portion of the bottom attachment 24, so as to be mounted on the vehicle body side via the mounting bolt 26. The cylindrical attachment 22 is caulked at a lower end portion thereof to an upper end opening of the bottom attachment 24 via a caulked portion 28. Reference numeral 30 designates a stopper attachment caulked at an upper end portion of the cylindrical attachment 22, and demonstrates an action as a stopper between the stopper portion 18 of the first fixture 12 and itself. Reference numeral 32 designates a stopper rubber covering an upper surface of the stopper attachment 30.

The vibration-isolating base member 16 is formed into a truncated conical shape, and an upper end portion thereof is bonded to the first fixture 12, and a lower end portion thereof is bonded to an upper end opening of the cylindrical attachment 22 respectively via vulcanization. A sealing wall portion 34 formed into a rubber membrane for covering an inner peripheral surface of the cylindrical attachment 22 is continued to a lower end portion of the vibration-isolating base member 16.

A first diaphragm 38, which is formed of a flexible rubber membrane, is arranged so as to oppose a lower surface of the vibration-isolating base member 16 in an axial direction X, and defines a liquid-sealed chamber 36 between the lower surface and itself is mounted to the second fixture 14, and liquid is sealed in the liquid-sealed chamber 36. The first diaphragm 38 includes an annular reinforcing attachment 39 on an outer peripheral portion thereof, and is fixed to the caulked portion 28 via the reinforcing attachment 39.

The liquid-sealed chamber 36 is partitioned into an upper main liquid chamber 42 having a chamber wall formed partly of the vibration-isolating base member 16, and a lower first auxiliary liquid chamber 44 having a chamber wall formed partly of the first diaphragm 38 by a partitioning member 40.

The partitioning member 40 includes a partitioning member body 46 formed of a rigid material such as metal into a circular shape in plan view and fitted to the inside of the cylindrical attachment 22 via the sealing wall portion 34, and a partitioning strike plate 48 arranged so as to come into abutment with the lower surface side of the partitioning member body 46. The partitioning strike plate 48 is a disk-shaped metal fitting having a circular opening at the center thereof, and is formed integrally with a second diaphragm 50 formed of a flexible rubber membrane in the opening at the center by vulcanizing molding. Then, the partitioning member body 46 is maintained in a state of being held between a stepped portion 34A formed on the sealing wall portion 34 and the partitioning strike plate 48 in the axial direction X by fixing the partitioning strike plate 48 by the caulked portion 28 together with the reinforcing attachment 39 of the first diaphragm 38.

Provided on the side of the first auxiliary liquid chamber 44 of the partitioning member 40 is a second auxiliary liquid chamber 52 partitioned from the first auxiliary liquid chamber 44 by the second diaphragm 50. More specifically, the partitioning member body 46 is formed with a circular depressing portion 54 at the center on the lower surface thereof, and the depressing portion 54 is closed by the second diaphragm 50 from below in a liquid-tight manner, so that the second auxiliary liquid chamber 52 having a circular shape in plan view and having a chamber wall formed partly of the second diaphragm 50 is formed as shown in FIG. 5(c) as well.

Figure 2:
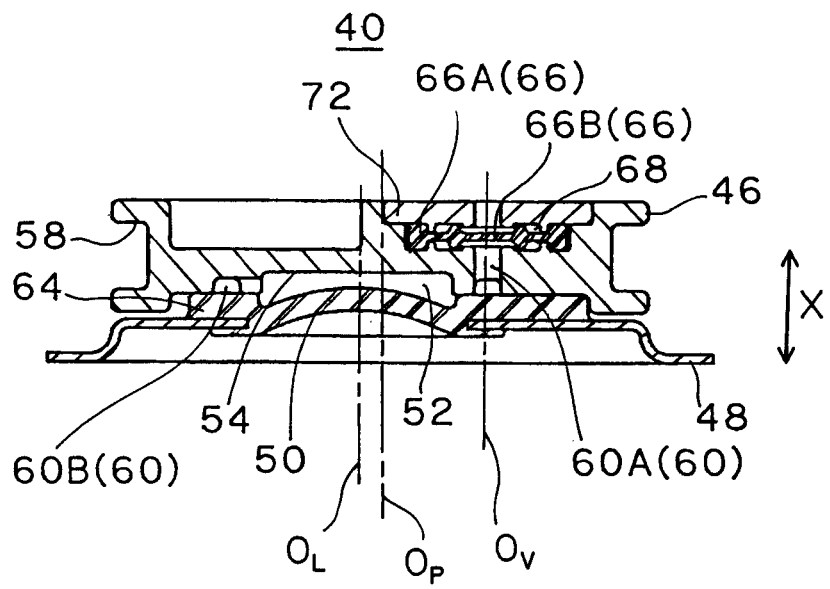
FIG. 2 is a cross-sectional view of a partitioning member of the same embodiment.

In this manner, the second auxiliary liquid chamber 52 is provided at the center of the partitioning member 40 on the side of the first auxiliary liquid chamber 44. In a narrow sense, in this example, a center $O_L$ of the second auxiliary liquid chamber 52 is arranged so as to be slightly deviated from a center (axial center) $O_P$ of the partitioning member 40 radially outwardly as shown in FIG. 2 and FIG. 5(b).

The main liquid chamber 42 and the first auxiliary liquid chamber 44 are communicated with each other via a first orifice flow channel 56 as a restricted flow channel. The first orifice flow channel 56 in this example is a low-frequency side orifice tuned to a low-frequency range (for example, on the order of 5 to 15 Hz) corresponding to shaking vibrations in order to damp the shake vibrations during the travel of the vehicle. In other words, it is tuned by adjusting the cross-sectional area and the length of the flow channel so that the damping effect on the basis of the resonant effect of the liquid flowing through the first orifice flow channel 56 is effectively demonstrated when inputting the shaking vibrations.

The first orifice flow channel 56 is provided on the outer peripheral side of the partitioning member 40. Specifically, the first orifice flow channel 56 extending in a circumferential direction C (see FIG. 5(b)) is defined between a first orifice forming groove 58 (see FIG. 5) provided on the outer periphery of the partitioning member body 46 and opened outward and the sealing wall portion 34. The first orifice flow channel 56 includes a main liquid chamber-side opening 56A opening toward the main liquid chamber 42 at one end in the circumferential direction C and an auxiliary liquid chamber-side opening 56B opening toward the first auxiliary liquid chamber 44 at the other end in the circumferential direction C as shown in FIG. 5(a).

The main liquid chamber 42 and the second auxiliary liquid chamber 52 are communicated with each other via a second orifice flow channel 60 as a restricted flow channel. The second orifice flow channel 60 is a high-frequency side orifice tuned in a higher frequency range than the first orifice flow channel 56 and, in this example, is tuned to a high-frequency range (for example, on the order of 15 to 50 Hz) corresponding to the idling vibrations in order to reduce the idling vibrations at the time of idling (when the vehicle is stopped). In other words, it is tuned by adjusting the cross-sectional area and the length of the flow channel so that the low-dynamic spring effect on the basis of the resonant effect of the liquid flowing through the second orifice flow channel 60 is effectively demonstrated when inputting the idling vibrations.

The second orifice flow channel 60 is provided on the side of the inner periphery of the partitioning member 40, and includes a first flow channel portion 60A extending in the thickness direction of the partitioning member 40 (in this example, the same direction as the axial direction X described above), and a second flow channel portion 60B connected to the first flow channel portion 60A on the side of the first auxiliary liquid chamber 44 of the partitioning member 40 and extending along the periphery of the second auxiliary liquid chamber 52.

Figure 5:
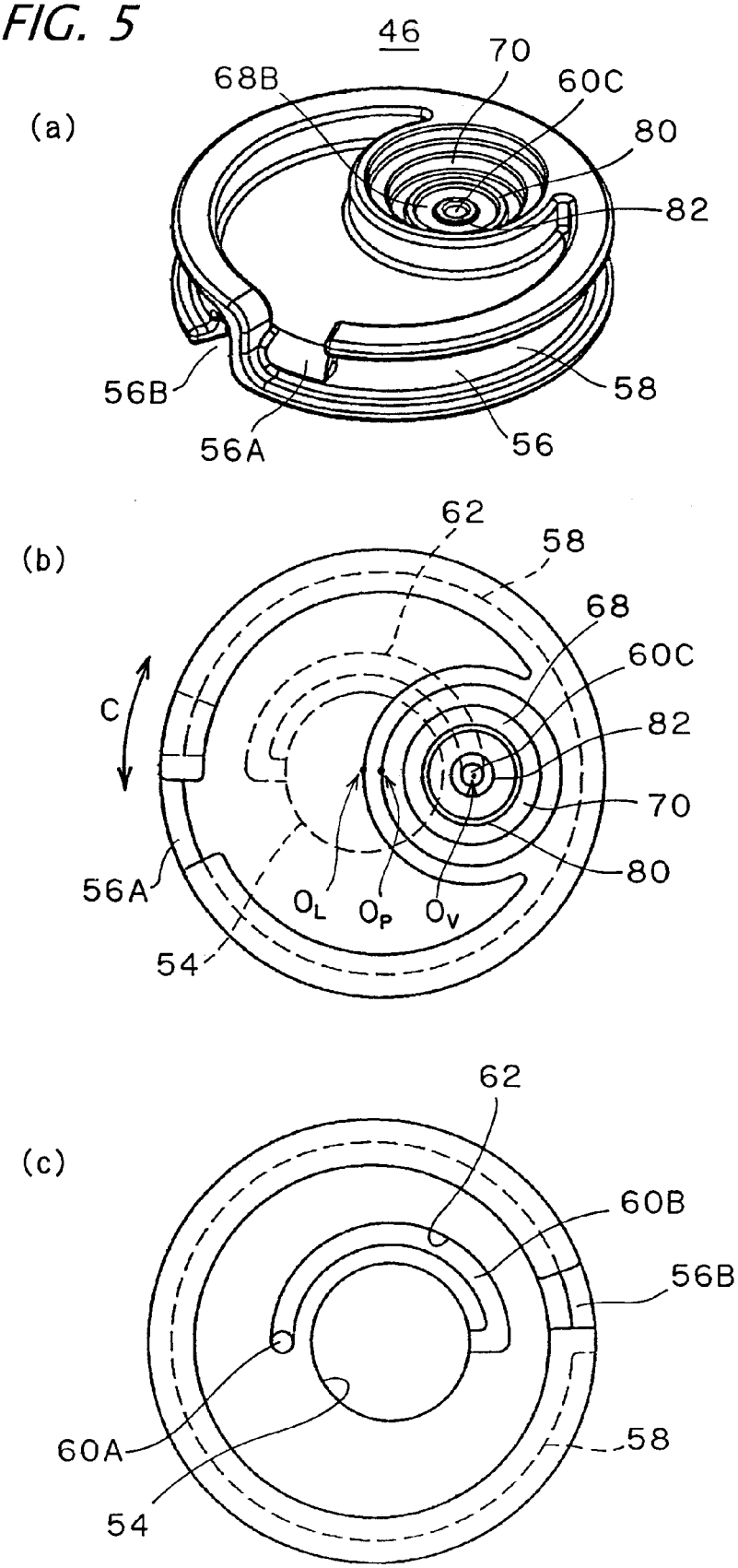
FIG. 5 shows a partitioning member body according to the same embodiment, in which (a) is a perspective view, (b) is a plan view, and (c) is a bottom view.

Specifically, as shown in FIG. 2, the second orifice flow channel 60 includes the first flow channel portion 60A penetrating through the partitioning member body 46 on the inner peripheral side of the first orifice forming groove 58 in the axial direction X and the arcuate-shaped second flow channel portion 60B provided on the radially outside of the second auxiliary liquid chamber 52 on the lower surface of the partitioning member body 46 and extending in the circumferential direction C (see FIG. 5). Then, the main liquid chamber 42 and the second auxiliary liquid chamber 52 are brought into communication with each other by the upper end of the first flow channel portion 60A opening toward the main liquid chamber 42, and one end of the second flow channel portion 60B connected to the lower end of the first flow channel portion 60A, and the other end of the second flow channel 60B connected to the second auxiliary liquid chamber 52. The second flow channel portion 60B is formed by liquid-tight sealing a second orifice forming groove 62 formed on the lower surface of the partitioning member body 46 so as to be depressed with a sealing rubber portion 64 formed on the upper surface of the partitioning strike plate 48 integrally and continuously from the outer peripheral portion of the second diaphragm 50.

Figure 3:
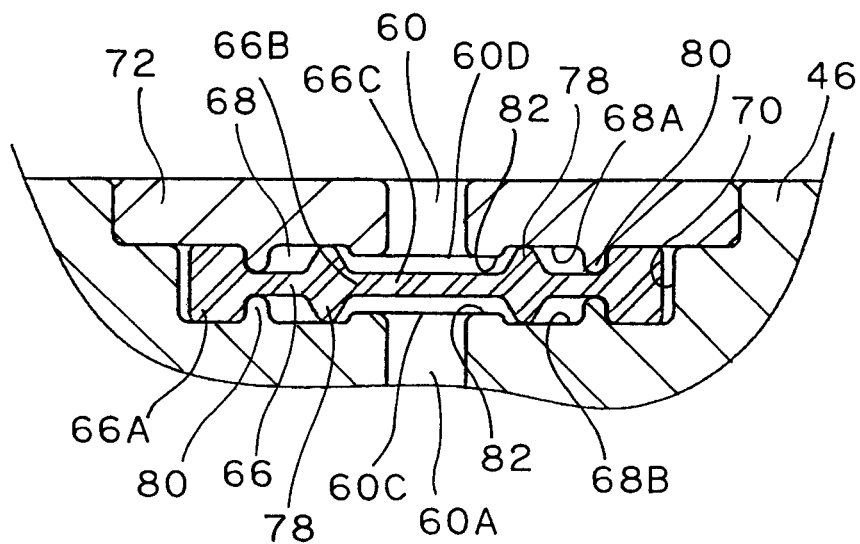
FIG. 3 is an enlarged cross-sectional view showing a principal portion of the same partitioning member.

The vibration isolator 10 is provided with a disk shaped (circular membrane type) valve member 66 formed of a rubber elastomer opening and closing the second orifice flow channel 60. The partitioning member 40 is provided with a valve housing chamber 68 partly in the second orifice flow channel 60 and the valve member 66 is housed and held in the valve housing chamber 68 so as to be orthogonal to the direction of flow in the second orifice flow channel 60. The valve member 66 is arranged at the intermediary position of the first flow channel portion 60A of the second orifice flow channel 60 so that the membrane surface is positioned orthogonally to the axial direction X as the direction of flow therein as shown in FIGS. 1 to 3.

Figure 6:
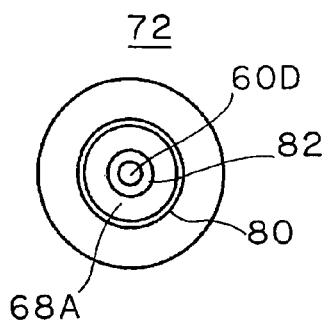
FIG. 6 is a bottom view of a lid member of the same embodiment.

Specifically, the partitioning member body 46 is provided with a stepped concave portion 70 having a circular shape in plan view on the upper surface thereof as shown in FIGS. 5(a) and (b), and a disk-shaped lid member 72 formed of a rigid material such as metal is fitted in and fixed to the opening side of the stepped concave portion 70, so that the valve housing chamber 68 is formed by a space defined by the stepped concave portion 70 and the lid member 72. As shown in FIG. 5(b), a circular opening 60C of the second orifice flow channel 60 is formed at the center of the stepped concave portion 70, and a circular opening 60D is formed at the center of the lid member 72 opposing thereto in the axial direction X as shown in FIG. 6, whereby the openings 60C and 60D correspond to the openings of the second orifice flow channel 60 toward the valve housing chamber 68.

Figure 4:
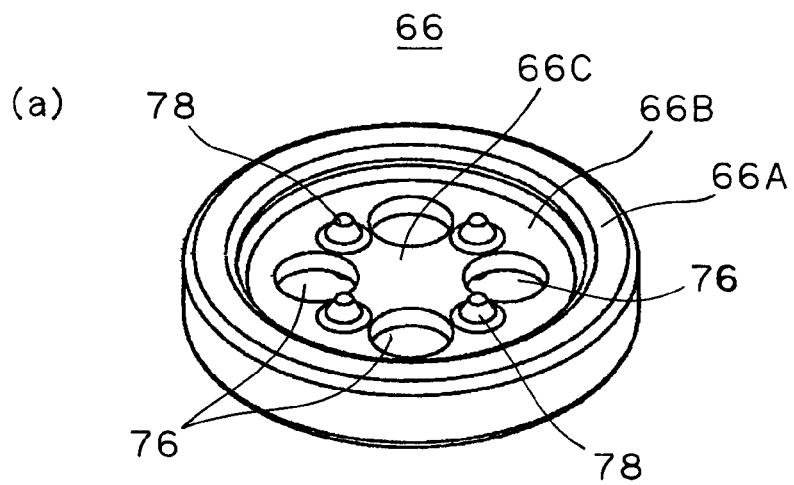
FIG. 4 shows a valve member according to the same embodiment, in which (a) is a perspective view, (b) is a plan view, and (c) is a cross-sectional view taken along the line a-a.
Figure 4:
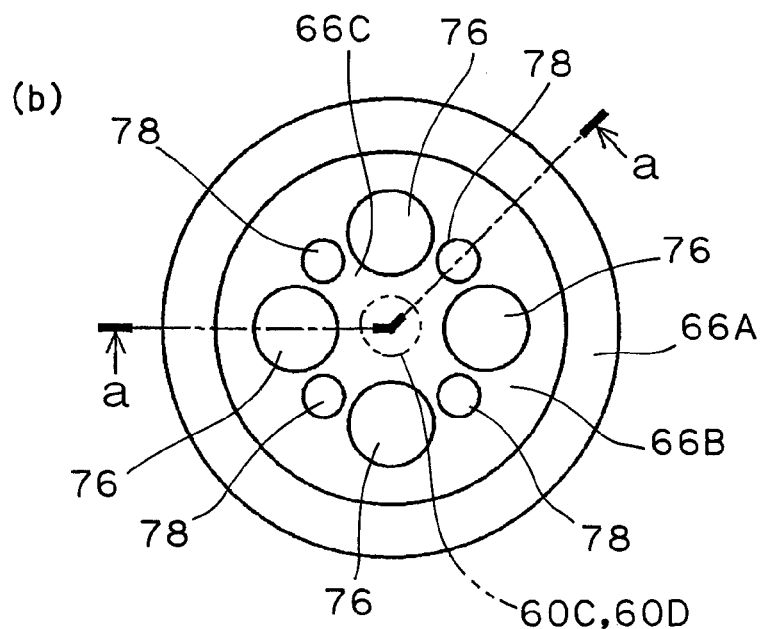
Figure 4:
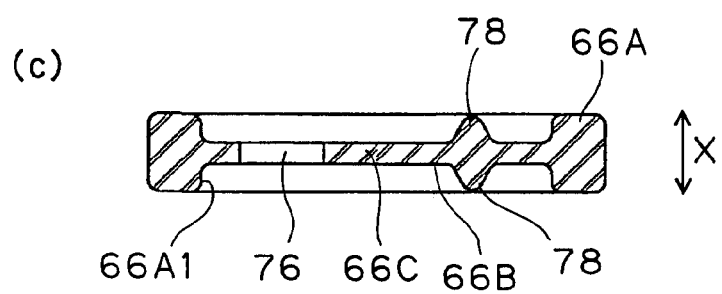

The valve member 66 is fitted into the stepped concave portion 70 and the lid member 72 is fixed thereto, so that the valve member 66 is held in the valve housing chamber 68 in a state in which an outer peripheral portion 66A is held between upper and lower wall surfaces 68A, 68B of the valve housing chamber 68 (that is, the lower surface of the lid member 72 and the bottom surface of the stepped concave portion 70) in a liquid-tight manner. As shown in FIG. 4, the valve member 66 includes the outer peripheral portion 66A which is thick along the entire periphery thereof and a flexible membrane portion 66B which is a thin membrane located inside the thick outer peripheral portion 66A. The membrane portion 66B is formed at an intermediate position in the direction of the thickness (the axial direction X) of the thick outer peripheral portion 66A so as to close the inner peripheral surface.

Figure 7:
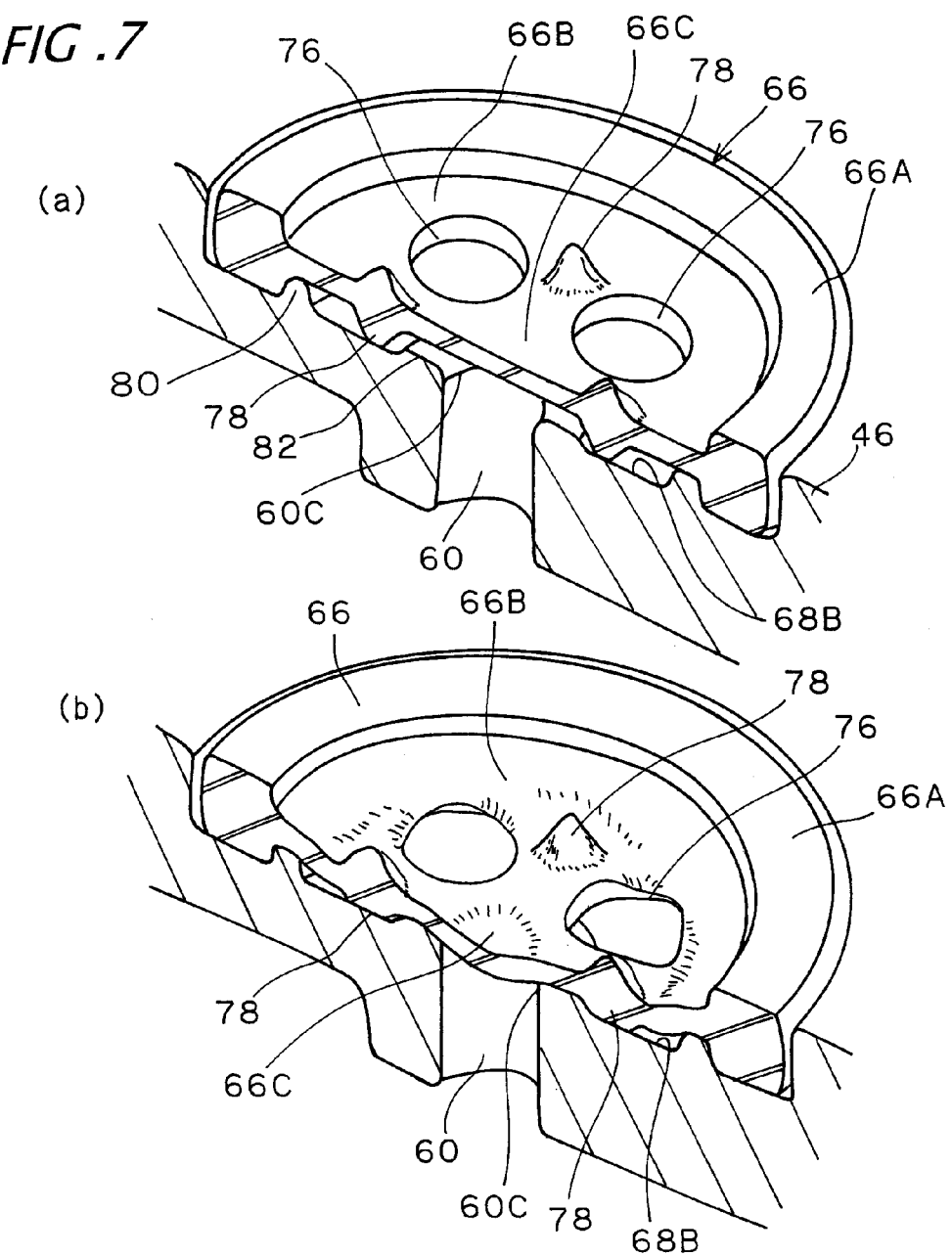
FIG. 7 is a perspective cross-sectional view of the valve member and the periphery thereof (the lid member is omitted) according to the same embodiment, in which (a) is a drawing showing a state in which the valve member is in a neutral position (a second orifice flow channel is in an opened state), (b) is a drawing showing the valve member in a state of flexural deformation (the second orifice flow channel is in a closed state).

The membrane portion 66B is subjected to the flexural deformation (elastic deformation) in the axial direction X from the neutral position shown in FIG. 7(a) by the liquid flow in the second orifice flow channel 60, thereby closing the openings 60C and 60D of the second orifice flow channel 60 as show in FIG. 7(b). Accordingly, the center portion of the membrane portion 66B opposing the openings 60C and 60D corresponds to a plug portion 66C which closes the openings.

As shown in FIG. 4, the membrane portion 66B is formed with a plurality of communicating holes 76 which communicates the second orifice flow channel 60 so as not to be overlapped with the openings 60C and 60D, that is, so as not to be overlapped when viewed in the axial direction X. The communicating holes 76 are formed at a plurality of positions on the periphery which surrounds the plug portion 66C positioned at the center of the membrane portion 66B and, in this example, the four circular shape communicating holes 76 are provided at regular intervals. The communicating holes 76 are configured to allow flow of the liquid into the second orifice flow channel 60 through the communicating hole 76 in the state in which the membrane portion 66B is moved away from the openings 60C and 60D, that is, in the state in which the plug portion 66C releases these openings (see FIG. 3), whereby opening the second orifice flow channel 60. A total opening area of the communicating hole 76 is set to be larger than the cross-sectional area of the second orifice flow channel 60, that is, larger than the surface areas of the openings 60C and 60D so as to avoid the restricting effect in the communicating holes 76.

The membrane portion 66B is formed with a plurality of projections 78 to be compressed to opposed wall surfaces 68A, 68B of the valve housing chamber 68 by the flexural deformation of the membrane portion 66B on the membrane surface at positions not overlapped with the openings 60C and 60D. The projections 78 are each formed into, a cone shape, a conical shape in this example as shown in FIG. 4, and are arranged alternately with the communicating holes 76 on the same circumference as the communicating holes 76. The projections 78 are formed on both upper and lower membrane surfaces of the membrane portion 66B and are formed in vertical symmetry. The projection 78 in this example are formed so that distal ends thereof, that is, top portions of the cone come into abutment with the wall surfaces 68A, 68B of the valve housing chamber 68 when the valve member 66 is in the neutral position. However, it is also possible to set the projections 78 so as not to come into abutment at the neutral position.

As shown in FIG. 3, provided on the upper and lower wall surfaces 68A, 68B of the valve housing chamber 68 are ring shaped restricting projections 80 which restrict inward displacement of the outer peripheral portion 66A by coming into abutment with an inner peripheral surface 66A1 of the thick outer peripheral portion 66A of the valve member 66 (see FIG. 4(c)). In other words, the restricting projections 80 are formed so as to oppose to each other in the vertical direction on the bottom surface of the stepped concave portion 70 and the lower surface of the lid member 72 as show in FIG. 5(a) and FIG. 6.

Also, as shown in FIG. 3, the peripheral edge portions of the openings 60C and 60D are provided as annular projecting portions 82 which project in the axial direction X (see FIGS. 5, 6), and are formed so as to project toward the membrane portion 66B with respect to the peripheral wall surfaces 68A, 68B with which the projections 78 come into abutment. The annular projecting portions 82 are formed into a circular shape in plan view which surrounds the circular openings 60C and 60D over the entire circumference. The distal end surfaces of the annular projecting portion 82 are flat and predetermined clearances are secured in the axial direction X between the flat distal end surfaces and the plug portion 66C at the center of the valve member 66, which opposes the distal end surfaces.

As shown in FIG. 2, the valve member 66 is arranged with a center $O_V$ thereof offset from the center $O_P$ of the partitioning member 40 on the opposite side from the center $O_L$ of the second auxiliary liquid chamber 52. In other words, the valve member 66 is arranged so that the center $O_V$ of the valve member 66 is deviated from the center $O_L$ of the second auxiliary liquid chamber 52 so that the first flow channel portion 60A opened and closed thereby is not overlapped with the second auxiliary liquid chamber 52 in a thickness direction X of the partitioning member 40. As shown in FIG. 2 and FIG. 5(b), although the valve member 66 in itself (see valve housing chamber 68 in FIG. 5(b)) is overlapped partly with the second auxiliary liquid chamber 52 when viewed in the thickness direction X, the valve member 66 is provided at a position sifted from the center of the partitioning member 40 toward the peripheral edge portion so as to avoid the first flow channel portion 60A positioned at the center $O_V$ thereof is not overlapped with the second auxiliary liquid chamber 52 (see the depressing portion 54 in FIG. 5(b)). In this example, the center $O_V$ of the valve member 66 is offset from the center $O_P$ of the partitioning member 40 by a value equal to or larger than the radius of the valve member 66.

With the liquid-sealed type vibration isolator 10 configured as described above, when the vibrations on the high-frequency side having a relatively small amplitude are input as in the idling state where the vehicle is stopped, since the flow of the liquid in the second orifice flow channel 60 is small, the membrane portion 66B of the valve member 66 is little subjected to flexural deformation. Therefore, as shown in FIG. 7(a), the second orifice flow channel 60 is not closed by the valve member 66, and liquid in the second orifice flow channel 60 can be moved back and forth between the main liquid chamber 42 and the second auxiliary liquid chamber 52 through the communicating holes 76 formed in the valve member 66. Therefore, a superior vibration isolation effect against the idling vibrations is demonstrated by the resonant effect of the liquid through the high-frequency side second orifice flow channel 60.

In contrast, when the vibrations on the low-frequency side having a relatively large amplitude are input as the shaking vibrations where the vehicle is traveling, since the flow of the liquid in the second orifice flow channel 60 is large, and hence the membrane portion 66B of the valve member 66 is pressed by the liquid flow in the direction X of the flow and is subjected to flexural deformation. Accordingly, as shown in FIG. 7(b), the second orifice flow channel 60 is closed by the membrane portion 66B. Therefore, since the liquid move back and forth between the main liquid chamber 42 and the first auxiliary liquid chamber 44 only via the first orifice flow channel 56 on the low-frequency side, a high damping performance against the shaking vibrations is demonstrated on the basis of the resonant effect of the liquid flowing in the first orifice flow channel 56.

In this manner, with the liquid-sealed type vibration isolator 10, since it is configured to close the second orifice flow channel 60 by the flexural deformation of the valve member 66 formed of a rubber elastomeric membrane, if the liquid flow to the valve member 66 is reduced, the second orifice flow channel 60 can be restored to the opened state by the restoration force that the valve member 66 has. Therefore, the characteristics of the two orifice flow channels 56, 60 can be switched without providing urging means such as a spring separately, so that the switchable liquid-sealed type vibration isolator can be provided with an inexpensive and compact structure.

The projections 78 are provided on the membrane portion 66B of the valve member 66 as described above, and the projections 78 are compressed to the wall surfaces 68A, 68B of the valve housing chamber 68 when the membrane portion 66B is subjected to the flexural deformation as shown in FIG. 7(b). By the repulsive forces of the compressed projections 78, the restoration force of the valve member 66 after the flexural deformation can further be increased. Therefore, the restoration of the valve member 66 after the flexural deformation is further ensured, so that the second orifice flow channel 60 can be brought into the opened state reliably and smoothly.

At the time of the flexural deformation of the valve member 66, the contact area between the valve member 66 and the wall surfaces 68A, 68B of the valve housing chamber 68 with the second orifice flow channel 60 closed can be reduced by restraining the displacement of the membrane portion 66B in the periphery of the projection 78. Therefore, an excellent effect is exerted in reduction of the abnormal sound due to the collision between the valve member 66 and the wall surfaces 68A, 68B.

In the embodiment described above, a plurality of the communicating holes 76 and the projections 78 are provided alternately on the same circumference on the valve member 66. Therefore, the restoration force of the valve member 66 after the flexural deformation can be enhanced, and a superior effect is achieved in reduction of the abnormal sound owing to the reduction of the contact area with respect to the wall surfaces 68A, 68B.

Since the restricting projections 80 are provided on the upper and lower wall surfaces 68A, 68B of the valve housing chamber 68, the restricting projections 80 come into abutment with the inner peripheral surface of the outer peripheral portion 66A of the valve member 66 when the valve member 66 is subjected to the flexural deformation and restrict the inward displacement thereof. Therefore, the valve member 66 can hardly be displaced (can hardly be moved) radially inwardly, and the performance of the valve member 66 can be maintained.

Since the wall surfaces 68A, 68B along the peripheral edge of the openings 60C and 60D opposing the plug portion 66C of the valve member 66 can be formed as the annular projecting portions 82 which are projected from the peripheries thereof, the clearance between the plug portion 66C and the openings 60C and 60D closed thereby can be adjusted easily by setting the height of the annular projecting portions 82. Therefore, adjustment of the range (input amplitude, etc.) in which the second orifice flow channel 60 is closed can easily be achieved.

Also, with the provision of the annular projecting portions 82, the stroke of the plug portion 66C until it closes the openings 60C and 60D is reduced, so that the impact at the time of contact is alleviated. Also, with the presence of the annular projecting portions 82, the contact between the valve member 66 and the wall surfaces 68A, 68B can be limited to the annular projecting portions 82, so that the reduction of the abnormal sound level due to the reduction of the contact area becomes also possible.

In this embodiment, since the valve member 66 is provided at the offset position on the partitioning member 40, the second orifice flow channel 60 can be set radially outward of the second auxiliary liquid chamber 52 after providing the second auxiliary liquid chamber 52 at the center of the partitioning member 40. In other words, since the valve member 66 is arranged so that the first flow channel portion 60A of the second orifice flow channel 60 which extends in the thickness direction X and is opened and closed by the valve member 66 is not overlapped with the second auxiliary liquid chamber 52 in the thickness direction X of the partitioning member 40, the lower end of the first flow channel portion 60A can be connected as-is to the second flow channel portion 60B around the second auxiliary liquid chamber 52. Therefore, a certain length of the second orifice flow channel 60 can be secured while restraining the thickness of the partitioning member 40 to be small. Here, if an attempt is made to provide the second flow channel portion around the second auxiliary liquid chamber in order to secure the long second orifice flow channel in the case where the first flow channel portion is overlapped with the second auxiliary liquid chamber, the first flow channel portion is arranged so as not to be overlapped with the second auxiliary liquid chamber, and hence it is necessary to lead out the first flow channel portion radially outward from the second auxiliary liquid chamber in order to connect the same to the second flow channel portion. Therefore, the partitioning member needs to be thicker by a thickness corresponding to the flow channel extending in the radial direction, and the structure becomes complicated. However, such a drawback can be resolved by the offset arrangement as described above.

Figure 8:
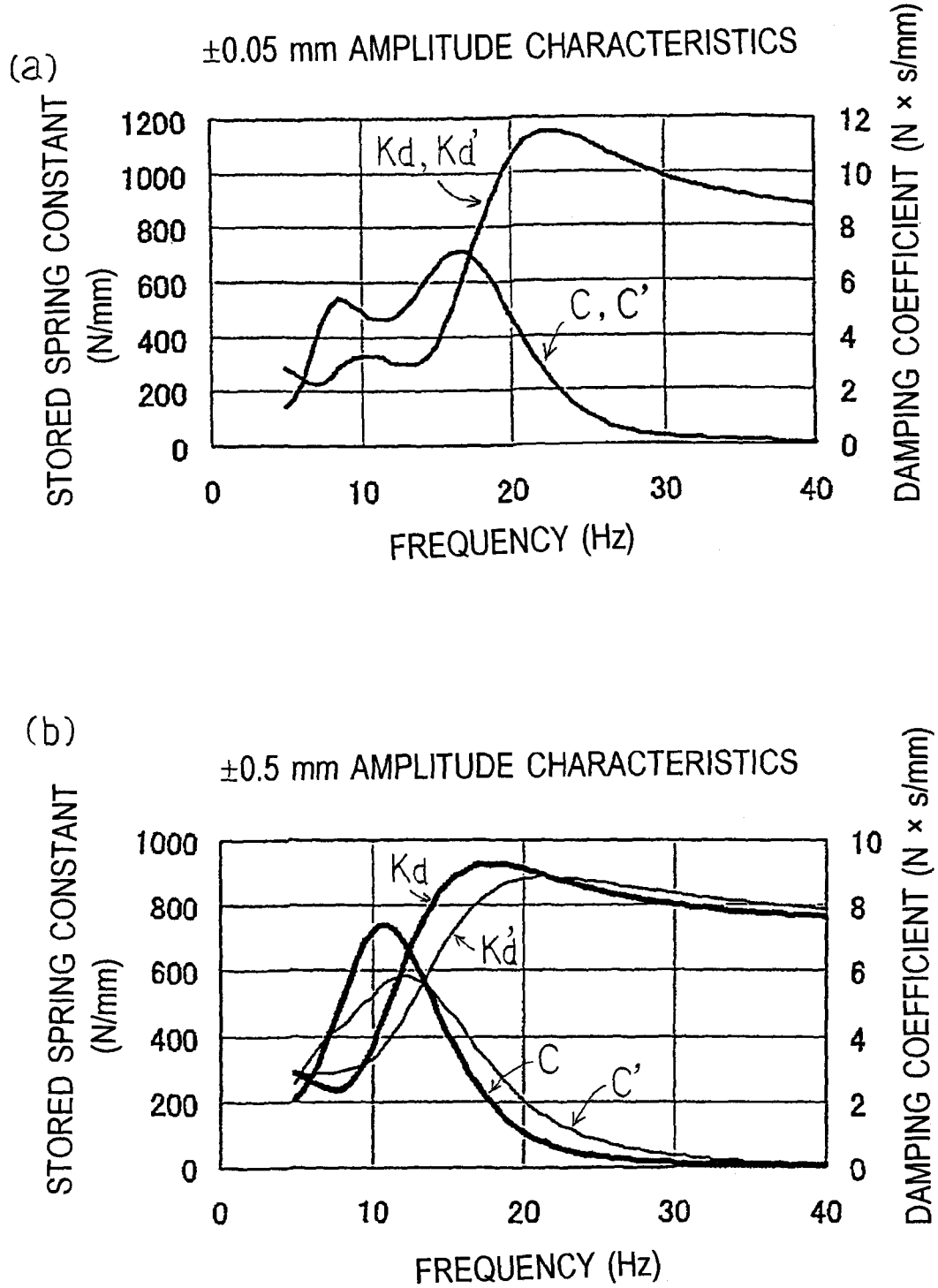
FIG. 8 is a graph showing vibration isolating characteristics of the liquid-sealed type vibration isolator according to the embodiment, in which (a) is a graph showing a state in which the amplitude is relatively small, and (b) is a graph showing a state in which the amplitude is relatively large.

FIG. 8 is a graph showing vibration isolating characteristics of the liquid-sealed type vibration isolator 10 according to the embodiment described above, which also shows characteristics of the liquid-sealed type vibration isolator having an orifice configuration in which the valve member 66 is omitted and other parts are similar to that in the embodiment as an comparative example.

As shown in FIG. 8(a), the characteristics of the embodiment (stored spring constant Kd and damping coefficient C) and the characteristics of the comparative example (the stored spring constant Kd' and the damping coefficient C') were the same with a relatively small amplitude (±0.05 mm). However, as shown in FIG. 8(b), in the characteristics (Kd, C) of the embodiment shown by a thick line, a higher damping performance C was secured on the low-frequency side with respect to the characteristics of the comparative example (Kd', C') shown by a thin line with a relatively large amplitude (±0.5 mm).

Figure 9:
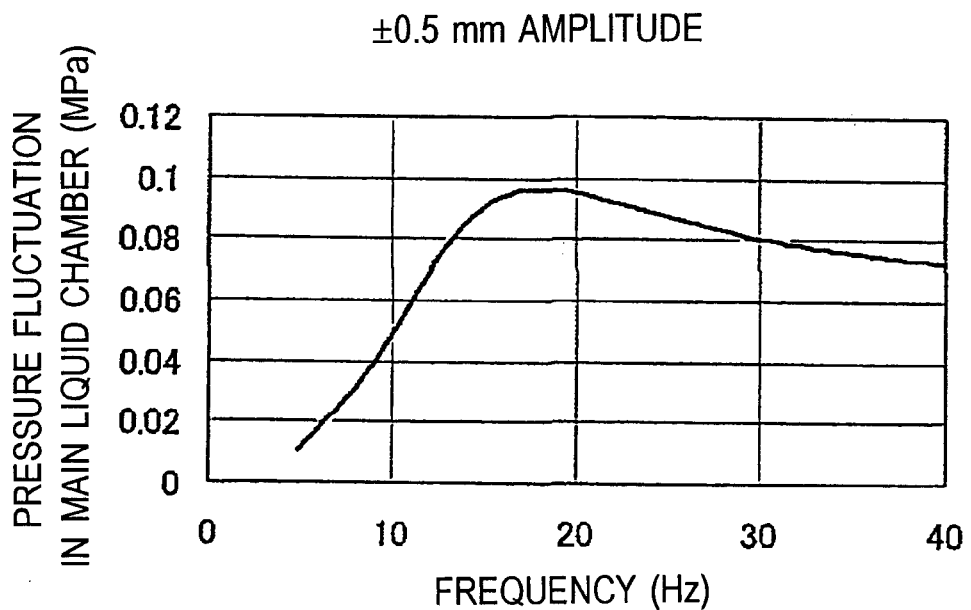
FIG. 9(a) is a graph showing pressure fluctuations in a main liquid chamber of the vibration isolator according to the embodiment and FIG. 9(b) is a graph showing a flow of liquid in the second orifice flow channel of the vibration isolator.
Figure 9:
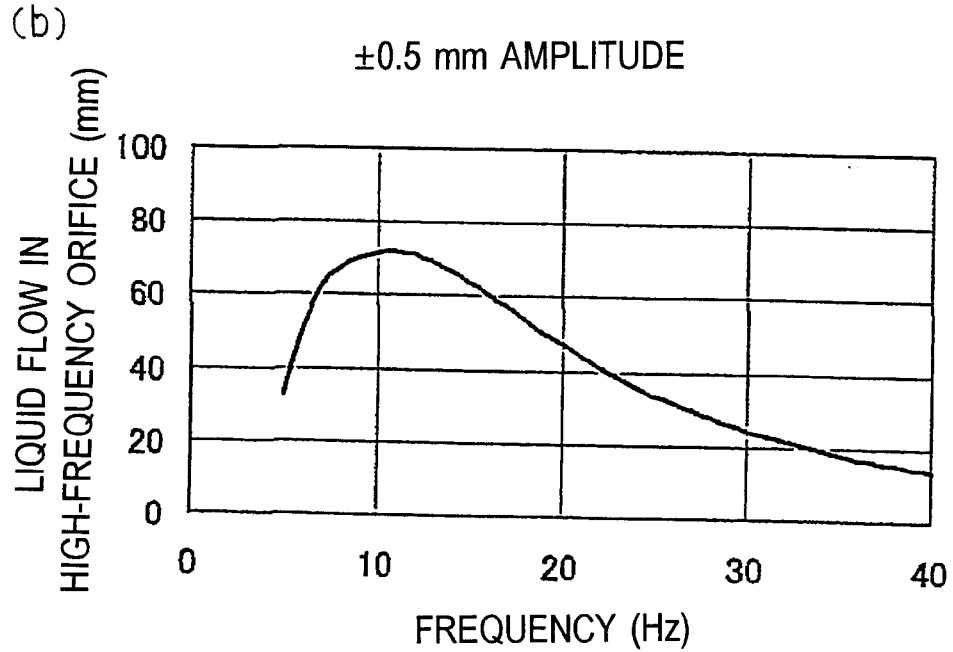

FIG. 9 are graphs showing (a) pressure fluctuations in the main liquid chamber 42, and (b) a relationship between the liquid flow in the high-frequency orifice (the second orifice flow channel 60) with respect to the frequency, with the relatively large amplitude (±0.5 mm).

The pressure fluctuations in the main liquid chamber 42 can be considered to be the same as the pressure difference between the main liquid chamber 42 and the second auxiliary liquid chamber 52 and, as in FIG. 9(a), in the configuration according to the embodiment, the liquid pressure fluctuations became the maximum at a point exceeding 15 Hz, and the pressure fluctuations on the lower-frequency side were smaller than that. In contrast, as the liquid flow in the second orifice flow channel 60, a large liquid flow was generated also at 7 Hz as shown in FIG. 9(b). Accordingly, the orifice switching characteristics are expected at lower frequency with the configuration according to the embodiment which is operated by the liquid flow in the second orifice flow channel than the configuration operated by the pressure difference between the liquid chambers as in Patent Document 2. In other words, in the configuration operated by the liquid flow in the second orifice flow channel 60 as in the case of the valve member 66 according to the embodiment, the liquid flow becomes active from the lower frequency range than the case of the pressure difference. Therefore, the second orifice flow channel 60 can be closed with a lower frequency, and is advantageous in damping of the shaking vibrations in the low-frequency range.

Second Embodiment

Figure 10:
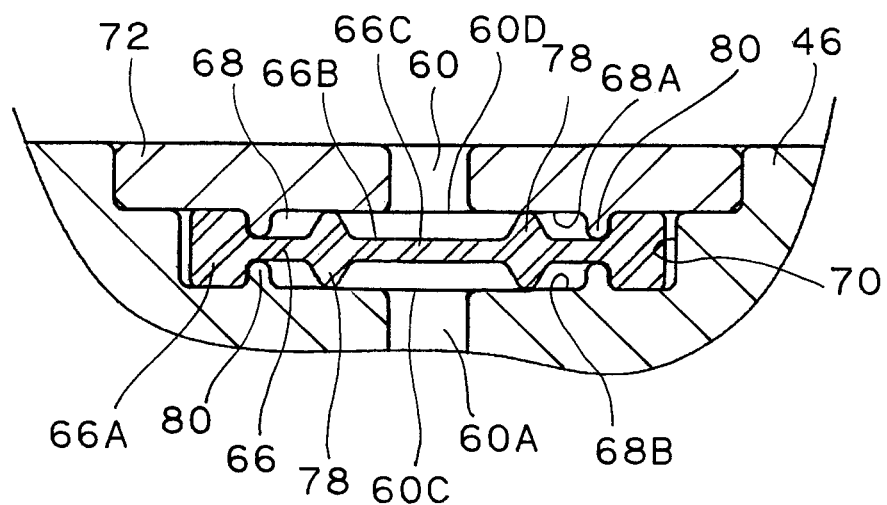
FIG. 10 is an enlarged cross-sectional view showing a principal portion of a partitioning member according to a second embodiment in which (a) is a drawing showing a state in which the valve member is in the neutral position, and (b) is a drawing showing a state in which the valve member is in a state of flexural deformation.
Figure 10:
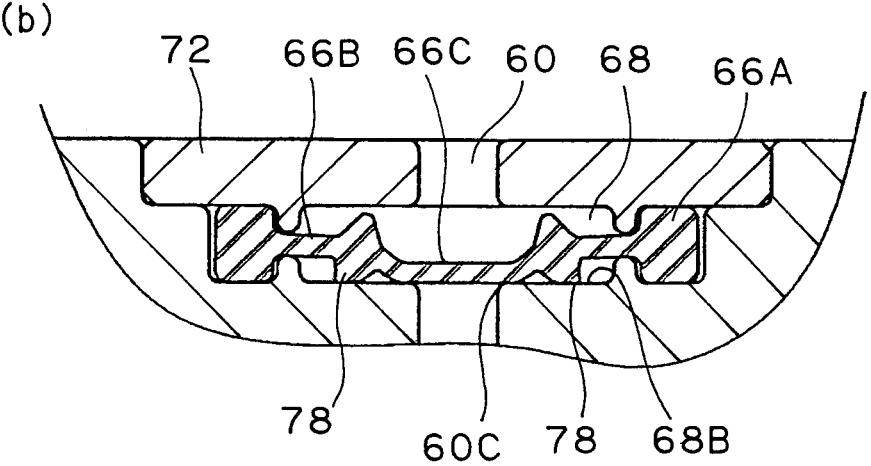

FIG. 10 is an enlarged cross-sectional view of a principal portion of the partitioning member 40 in the liquid-sealed type vibration isolator according to a second embodiment. This example is different from the first embodiment in that the annular projecting portions 82 are not provided around the openings 60C and 60D of the valve housing chamber 68, and other configurations are the same as those in the first embodiment and the description is omitted. As regards the effects and advantages, the effects and the advantages on the basis of the annular projecting portions cannot be obtained, other effects and the advantages are the same as those in the first embodiment.

Third Embodiment

Figure 11:
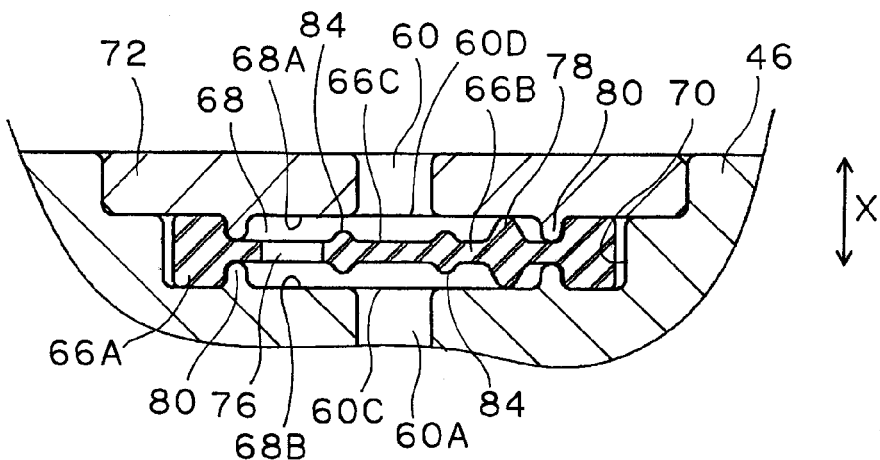
FIG. 11 is an enlarged cross-sectional view showing a principal portion of the partitioning member according to a third embodiment.

FIG. 11 is an enlarged cross-sectional view of a principal portion of the partitioning member 40 in the liquid-sealed type vibration isolator according to a third embodiment. In this example, annular projecting portions 84 are integrally formed with the membrane portion 66B of the valve member 66 opposing the peripheral edge portion instead of providing the annular projecting portions 82 on the peripheral edge portions of the openings 60C and 60D of the partitioning member 40.

Figure 12:
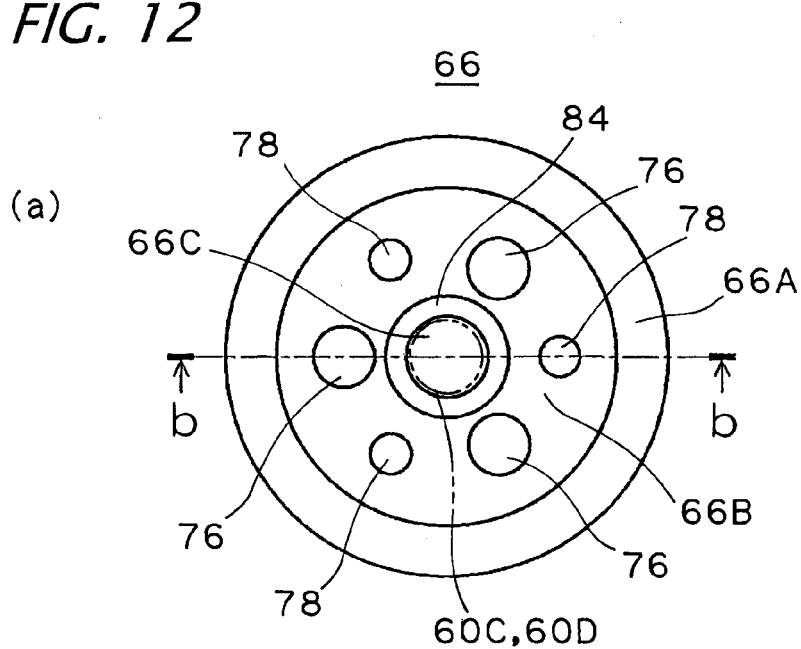
FIG. 12 shows a valve member according to the third embodiment, in which (a) is a plan view and (b) is a cross-sectional view taken along the line b-b.
Figure 12:
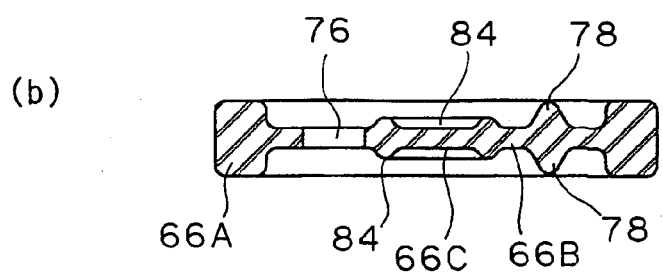

The annular projecting portions 84 are formed into a circular shape in plan view so as to surround the openings 60C and 60D over the entire circumference thereof inside the communicating holes 76 and the projections 78 and outside the openings 60C and 60D as shown in FIGS. 11 and 12. More specifically, the annular projecting portions 84 are provided along the outer peripheral portion of the plug portion 66C which closes the openings 60C and 60D, and are provided both on the upper and lower surfaces of the membrane portion 66B in vertically symmetry. The annular projecting portions 84 are set to have the projecting height lower than the projections 78. As shown in FIG. 11, predetermined clearances are secured in the axial direction X with respect to the wall surfaces 68A, 68B at the peripheral edges of the openings 60C and 60D.

Also in the case where the annular projecting portions 84 are provided on the valve member 66, the clearances between the valve member 66 and the openings 60C and 60D closed thereby can be easily adjusted by setting the height of the annular projecting portions 84, so that the range (input amplitude, etc.) in which the second orifice flow channel 60 is closed can be adjusted easily. Also, with the provision of the annular projecting portions 84, the stroke of the valve member 66 until it closes the openings 60C and 60D is reduced, so that the impact at the time of contact is alleviated. Also, with the presence of the annular projecting portions 84, the contact between the valve member 66 and the wall surfaces 68A, 68B can be limited to the annular projecting portions 84, so that the reduction of the abnormal sound level due to the reduction of the contact area becomes also possible. Other configurations and advantages are the same as those in the first embodiment, and description will be omitted.

Fourth Embodiment

Figure 13:
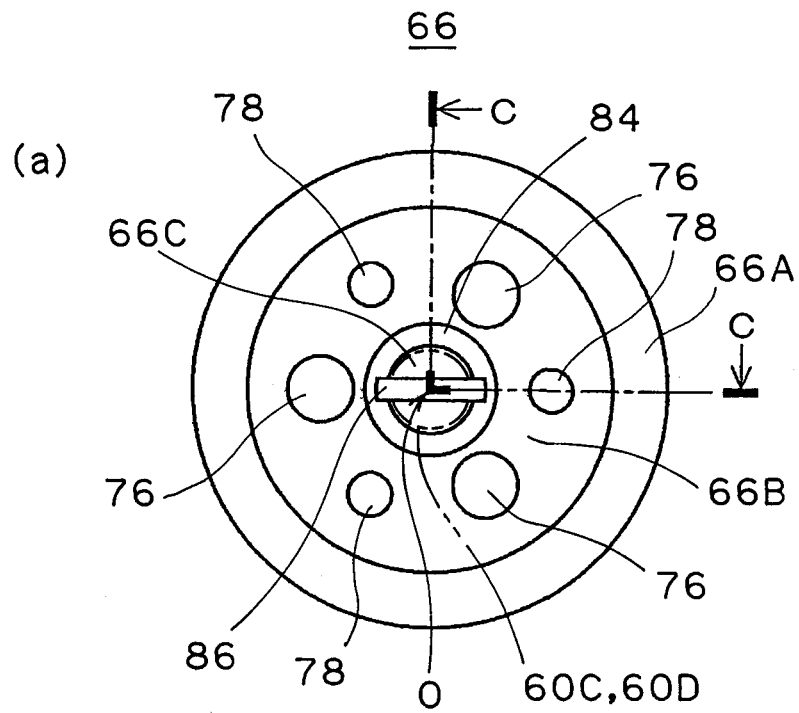
FIG. 13 shows a valve member according to a fourth embodiment, in which (a) is a plan view and (b) is a cross-sectional view taken along the line c-c.
Figure 13:
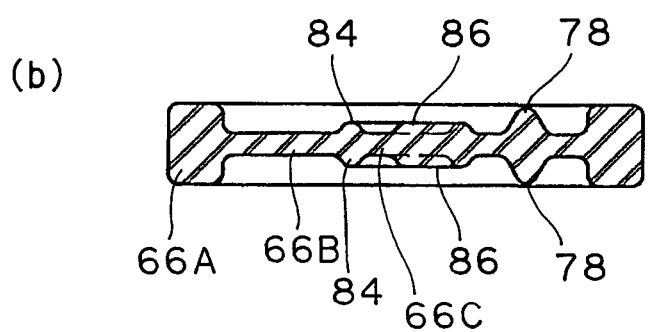
Figure 14:
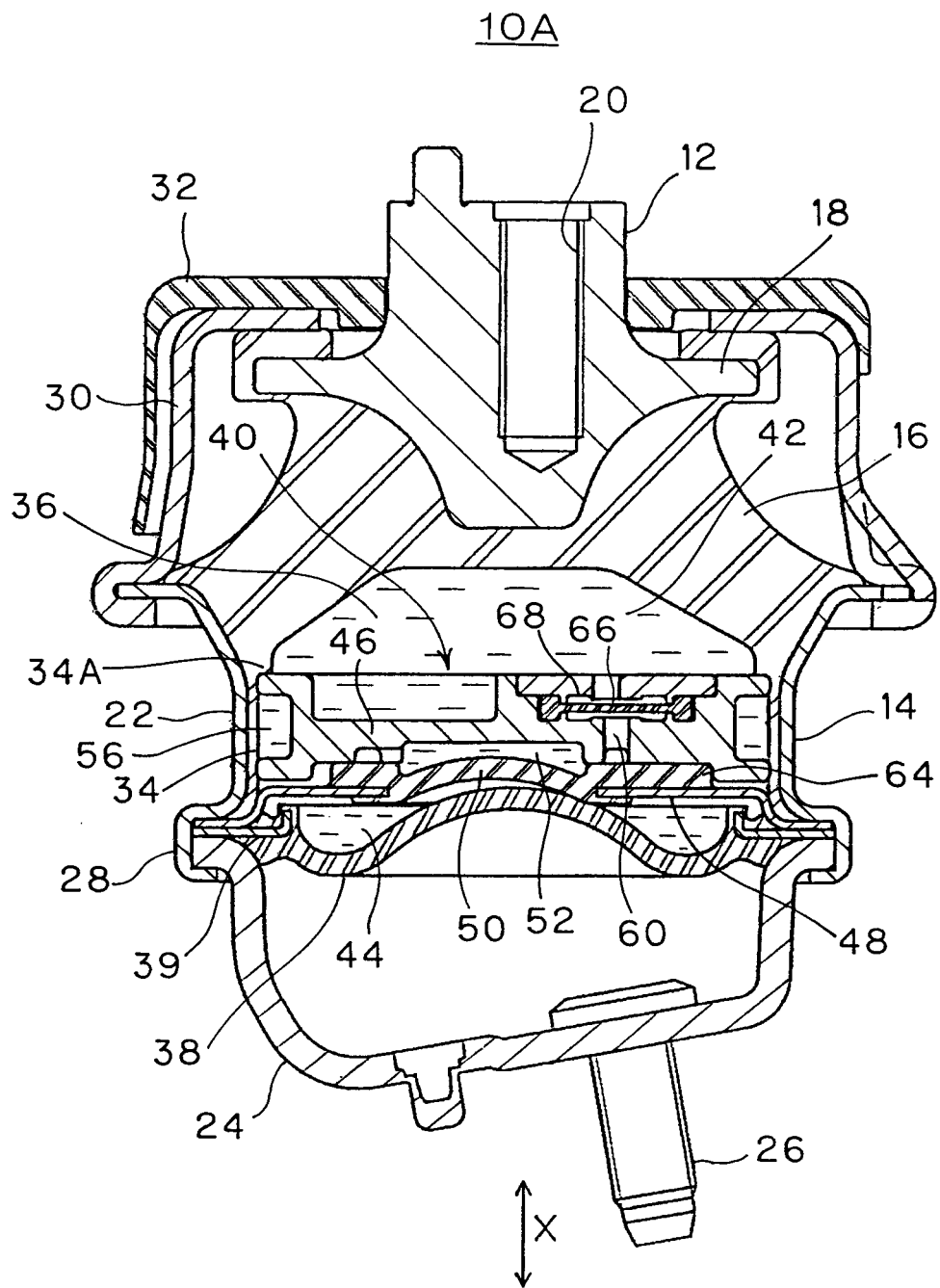
FIG. 14 is a vertical cross-sectional view of a liquid-sealed type vibration isolator according to a fifth embodiment.
Figure 15:
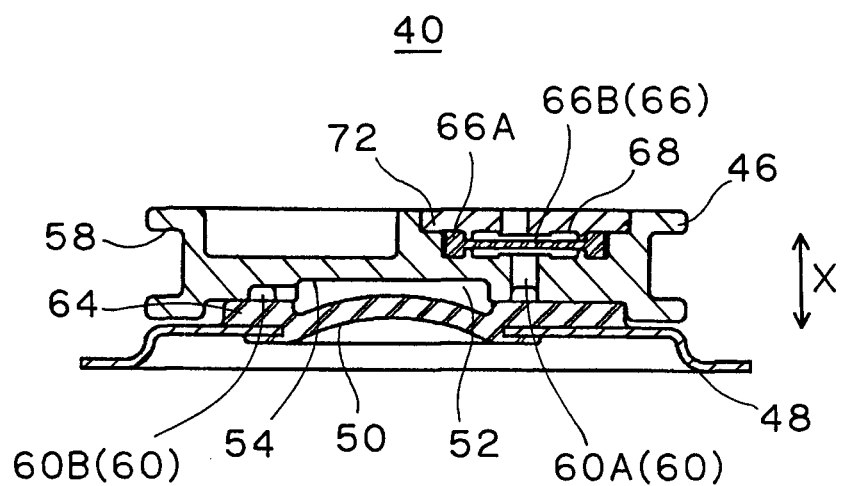
FIG. 15 is a cross-sectional view of a partitioning member according to the fifth embodiment.
Figure 16:
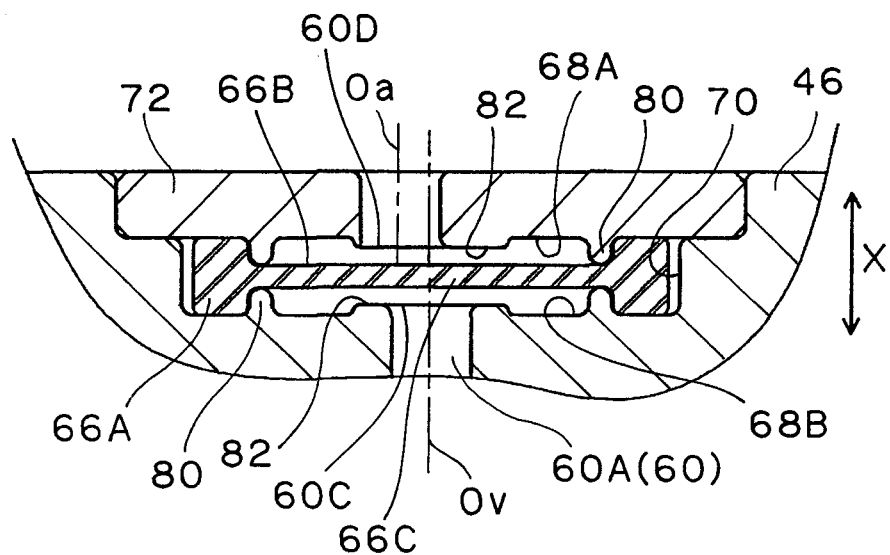
FIG. 16 is an enlarged cross-sectional view showing a principal portion of the same partitioning member (the valve member is in the neutral position).
Figure 17:
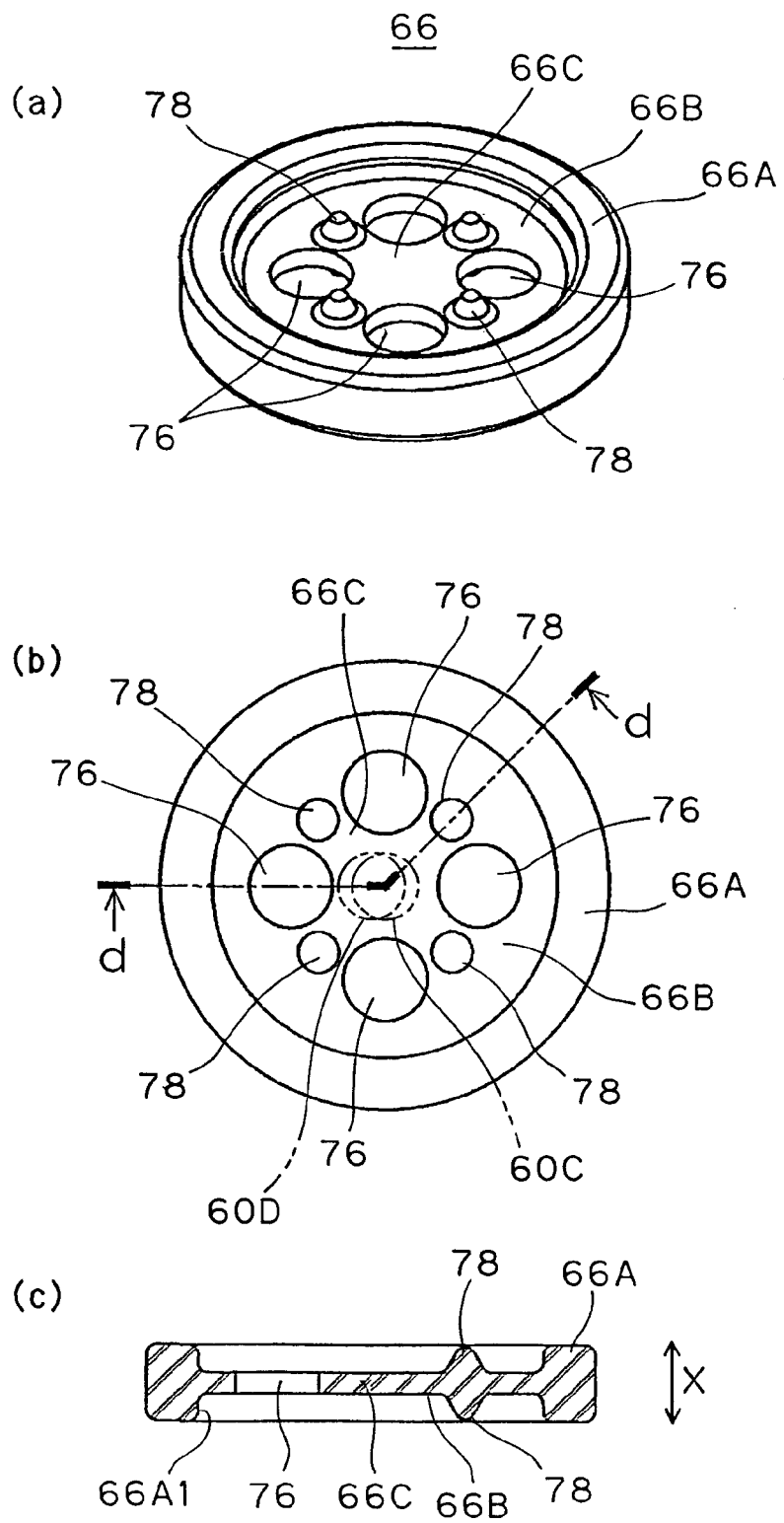
FIG. 17 shows the valve member of the fifth embodiment, in which (a) is a perspective view, (b) is a plan view, and (c) is a cross-sectional view taken along the line d-d.
Figure 18:
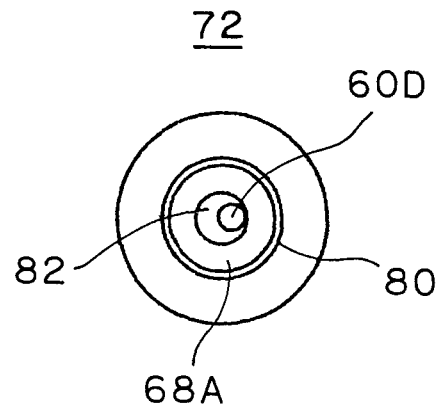
FIG. 18 is a bottom view of a lid member of the fifth embodiment.

FIG. 13 relates to a fourth embodiment, and shows the valve member 66. In this example, the annular projecting portions 84 are provided on the membrane portion 66B of the valve member 66 as in the third embodiment and, in addition, radially projecting portions 86 extending in the radial direction from a center O of the annular projecting portions 84 are provided inside the annular projecting portion 84.

The radially projecting portions 86 may be formed into a Y-shape so as to extend in three directions from the center O or a cross shape extending in four directions. However, in this example, as shown in FIG. 13(a), the radially projecting portions 86 are formed into an I-shape extending linearly so as to be connected to two points of the annular projecting portions 84 opposed in the direction of the diameter thereof. The radially projecting portions 86 are connected at the radially outer ends to the annular projecting portions 84, whereby the plug portion 66C inside the annular projecting portions 84 is enhanced in rigidity and reinforced, so that the plug portion 66C is prevented from being subjected to flexural deformation. The radially projecting portions 86 are provided on the annular projecting portions 84 on both the upper and lower surfaces thereof in vertical symmetry.

With the provision of the annular projecting portions 84 and the radially projecting portions 86 in combination, the following effects and advantages are achieved in addition to the third embodiment. When the second orifice flow channel 60 is closed, adsorption of the membrane portion 66B of the valve member 66 to the partitioning member 40, that is, deformation of the plug portion 66C as if it is sucked into the openings 60C or 60D of the partitioning member 40 can be prevented, so that a problem that the valve member 66 can hardly be restored to the neutral position can be avoided. Other configurations and advantages are the same as those in the first embodiment, and description will be omitted.

Fifth Embodiment

FIGS. 14 to 19 relates to a liquid-sealed type vibration isolator 10A according to a fifth embodiment. In this embodiment, the upper (that is, on the side of the lid member 72) opening 60D from between the upper and lower openings 60C and 60D respectively opposing the membrane surface on the both upper and lower sides of the membrane portion 66B of the valve member 66 is provided at a position deviated from the center $O_V$ of the valve member 66 (see FIG. 16). In other words, the upper opening 60D is provided so that a center Oa thereof is offset from the center $O_V$ of the valve member 66 instead of being provided coaxially. The amount of offset is not specifically limited. However, the offset opening 60D is set within the area inside the communicating holes 76, that is, the range opposing the plug portion 66C so as to be closed by the membrane portion 66B which is subjected to flexural deformation. In this example, the lower (on the side of the concave portion 70) opening 60C is provided coaxially with the center $O_V$ of the valve member 66.

Figure 19:
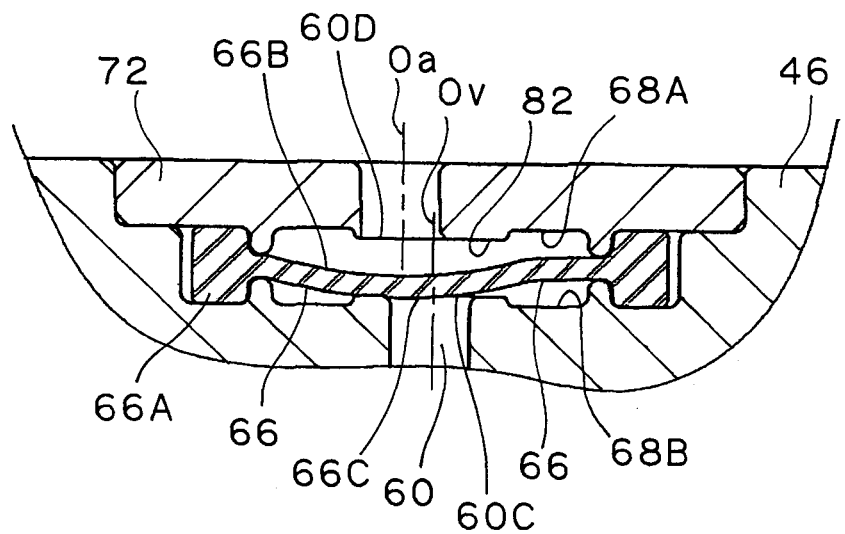
FIG. 19 is an enlarged cross-sectional view showing a principal portion of the same partitioning member in the state in which the valve member is in the state of flexural deformation.

Since the opening 60D of the second orifice flow channel 60 which flows into the valve member 66 is deviated (offset) with respect to the center Oa of the valve member 66, the membrane portion 66B which is subjected to the flexural deformation due to the liquid flow from the opening 60D is subjected to the flexural deformation not from the center $O_V$, but from the offset position Oa as a starting point. Therefore, the flexural deformation is non-uniform on the circumference. Therefore, the contact of the valve housing chamber 68 with the wall surface 68B is non-uniform on the circumference as shown in FIG. 19, and hence the timing of contact to the wall surface 68B is decentralized in comparison with the case of flexural deformation uniform over the circumference. Therefore, the abnormal sound level caused by the contact with the valve housing chamber 68 due to the flexural deformation of the valve member 66 can be reduced.

In this embodiment, only the upper opening 60D from between the opposing openings 60C and 60D on both the front and back sides of the valve member 66 is deviated. However, a configuration in which only the lower opening 60C is deviated, or a configuration in which the both openings 60C, 60D are deviated is also applicable. When deviating the both openings 60C and 60D, the both may be deviated in the same direction with respect to the center $O_V$ of the valve member 66, or may be deviated in the different directions.

In the fifth embodiment, other configurations and advantages are the same as those in the first embodiment, and description will be omitted.

Sixth Embodiment

Figure 20:
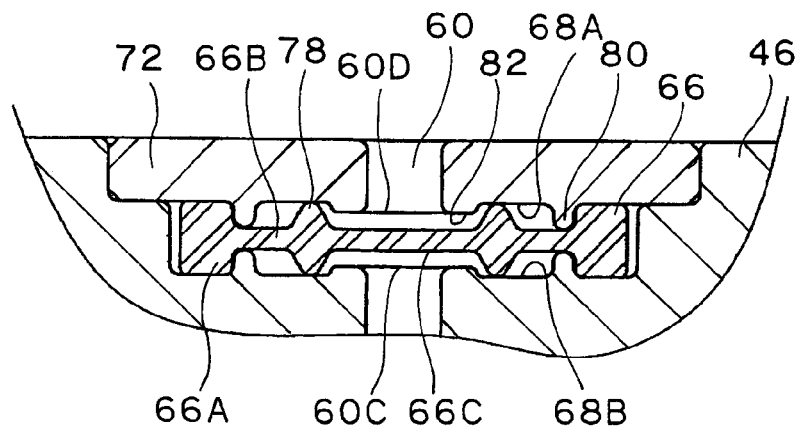
FIG. 20 is an enlarged cross-sectional view showing a principal portion of a partitioning member according to a sixth embodiment.
Figure 21:
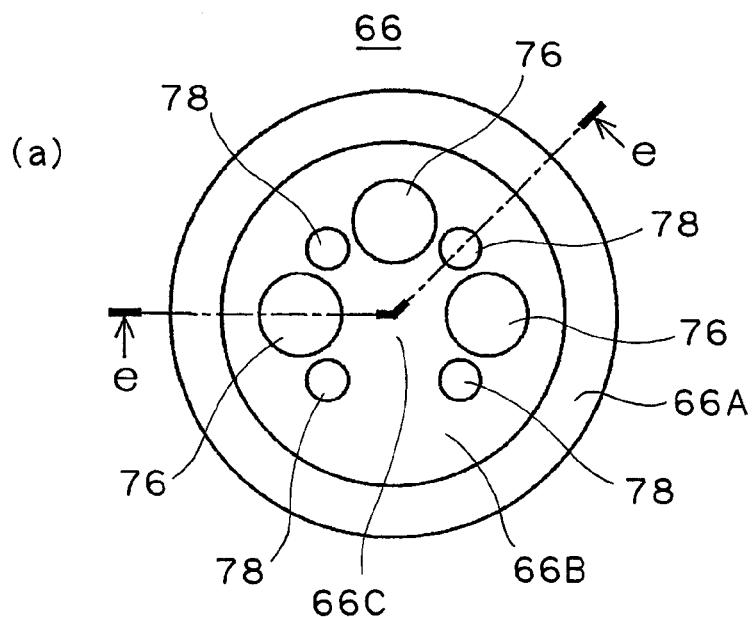
FIG. 21 shows the valve member according to the sixth embodiment, in which (a) is a plan view and (b) is a cross-sectional view taken along the line e-e.
Figure 21:
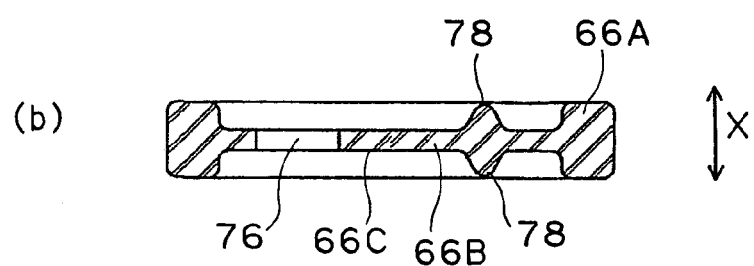

FIGS. 20 and 21 relate to a liquid-sealed type vibration isolator according to a sixth embodiment. In this example, instead of deviating the openings 60C and 60D of the partitioning member 40, the rigidity of the membrane portion 66B of the valve member 66 is set to be non-uniform over the circumference.

In other words, the openings 60C and 60D of the second orifice flow channel 60 toward the valve housing chamber 68 are provided coaxially with respect to the center of the valve member 66 and are not offset as shown in FIG. 20.

In contrast, the rigidity of the membrane portion 66B is set to be non-uniform over the circumference surrounding the plug portion 66C positioned at the center. As shown in FIG. 21, in this example, the communicating holes 76 provided on the membrane portion 66B are arranged at non-uniform intervals in the circumferential direction at a plurality of positions on the circumference which surround the plug portion 66C. In other words, in contrast to the case shown in FIG. 17(b) in which the four communicating holes 76 are arranged uniformly at the intervals of 90 degrees, in the example shown in FIG. 21(a), one of those is omitted, and three communicating holes 76 are provided so that the distance between the communicating holes 76 at the omitted portion is as large as 180 degrees, whereby the disposition pitch of the communicating holes 76 is non-uniform in the circumferential direction.

With the non-uniform arrangement pitch of the communicating holes 76 on the circumference, the rigidity of the valve member 66 becomes non-uniform in the circumferential direction, so that the flexural deformation of the membrane portion 66B becomes non-uniform in the circumference. Therefore, at the time of the flexural deformation, the contact to the opposed wall surfaces 68A and 68B of the valve housing chamber 68 can be brought into the non-uniform state over the circumference, and hence the abnormal sound level caused by the contact may be reduced as in the fifth embodiment. Other configurations and advantages are the same as those in the first embodiment, and description will be omitted.

Seventh Embodiment

Figure 22:
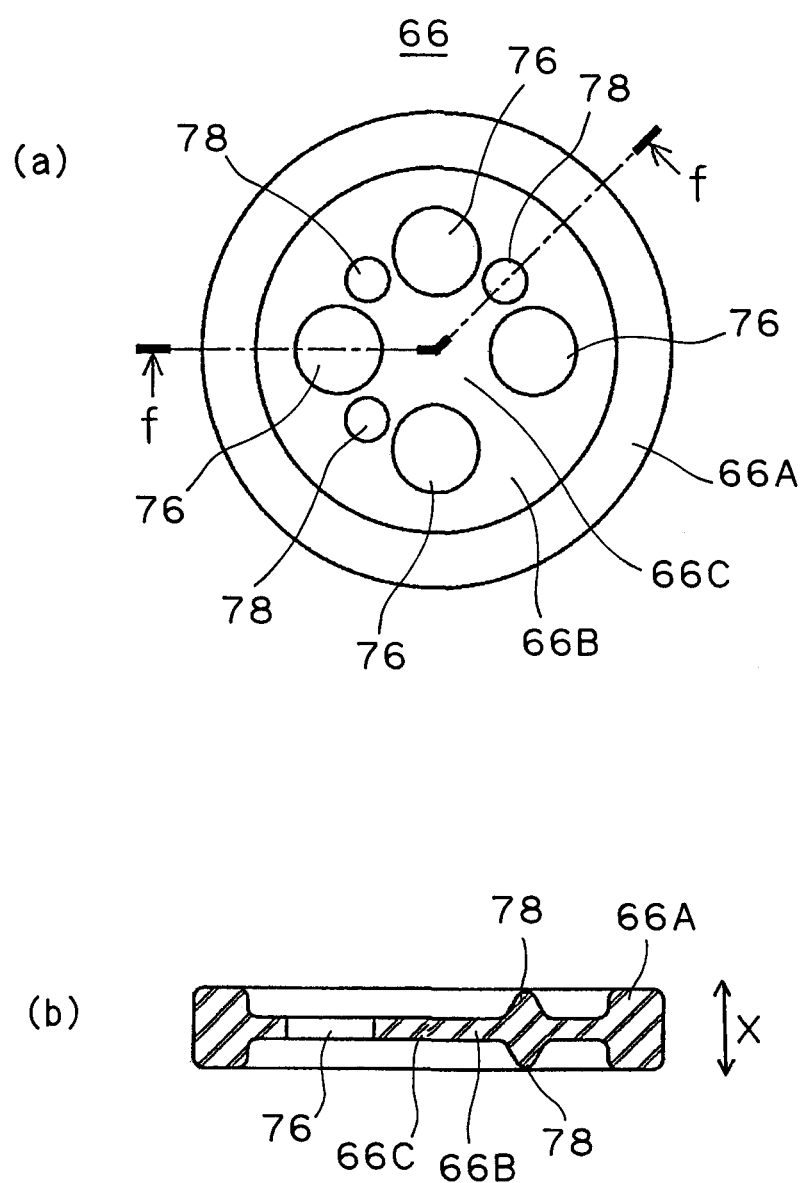
FIG. 22 shows a valve member according to a seventh embodiment, in which (a) is a plan view and (b) is a cross-sectional view taken along the line f-f.

FIG. 22 is a drawing showing the valve member 66 of the liquid-sealed type vibration isolator according to a seventh embodiment. In this example, instead of making the disposition pitch of the communicating holes 76 non-uniform over the circumference as in the sixth embodiment, the disposition pitch of the projections 78 is set to be non-uniform over the circumference.

In other words, in this example, the projections 78 provided on the membrane portion 66B are arranged at non-uniform intervals over the circumferential direction at a plurality of positions on the circumference which surrounds the plug portion 66C. More specifically, in contrast to the case shown in FIG. 17(b) in which the four projections 78 are arranged uniformly at the intervals of 90 degrees, in the example shown in FIG. 22(a), one of those is omitted, and three projections 78 are provided so that the distance between the projections 78 at the omitted portion is as large as 180 degrees, whereby the disposition pitch of the projections 78 is non-uniform in the circumferential direction.

Accordingly, since the rigidity of the membrane portion 66B becomes non-uniform over the circumference, the flexural deformation of the membrane portion 66B becomes the non-uniform state over the circumference as in the case of the sixth embodiment, so that the abnormal sound level caused by the contact between the membrane portion 66B and the valve housing chamber 68 can be reduced. Other configurations and advantages are the same as those in the first embodiment, and description will be omitted.

In the seventh embodiment, if the disposition pitch of the projection 78 is set to be non-uniform over the circumference, the non-uniformity may be set on the membrane surfaces on the both sides of the membrane portion 66B or may be set on one of the membrane surfaces.

Eighth Embodiment

Figure 23:
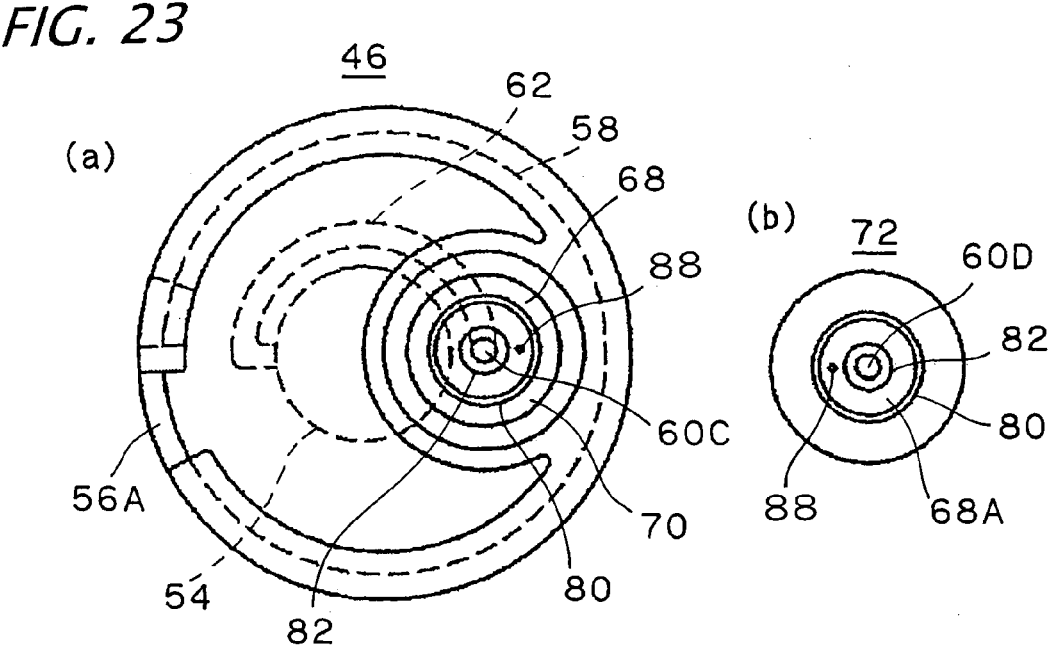
FIG. 23(a) is a plan view of a partitioning member body according to an eighth embodiment and FIG. 23(b) is a bottom view of a lid member of the same embodiment.
Figure 24:
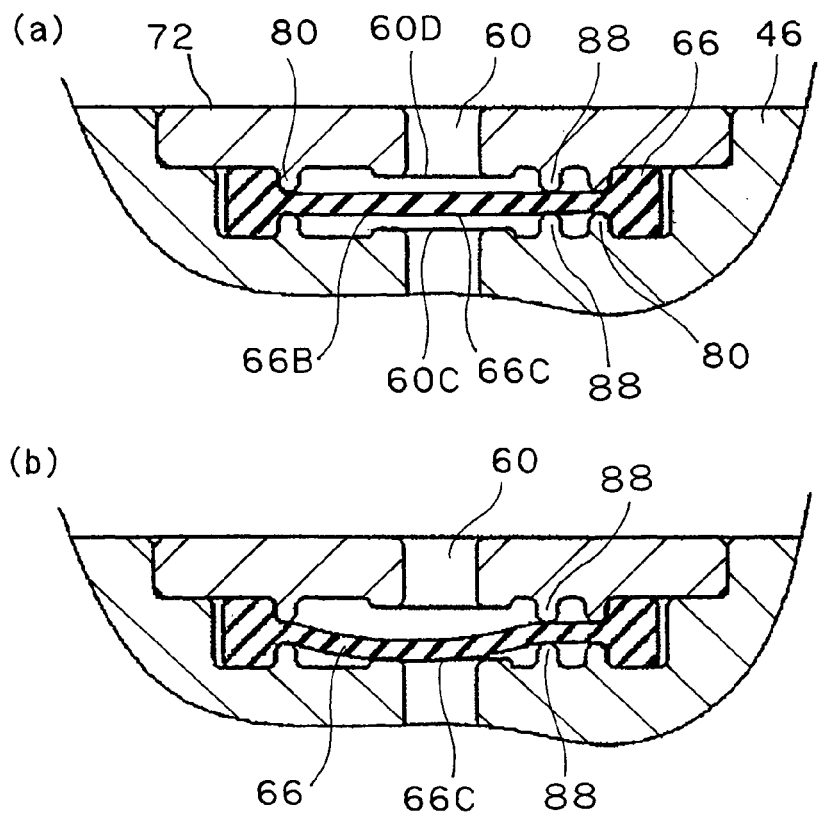
FIG. 24 is an enlarged cross-sectional view showing a principal portion of a partitioning member according to the eighth embodiment in which (a) is a drawing showing a state in which the valve member is in the neutral position, and (b) is a drawing showing a state in which the valve member is in a state of flexural deformation.

FIGS. 23 and 24 relate to a liquid-sealed type vibration isolator according to an eighth embodiment. In this example, instead of deviating the openings 60C and 60D of the partitioning member 40, flexural deformation restricting projections 88 are provided on the wall surfaces 68A, 68B of the valve housing chamber 68 opposing the membrane portion 66B non-uniformly over the circumference.

In other words, in this example, the openings 60C and 60D of the second orifice flow channel 60 toward the valve housing chamber 68 are provided coaxially with respect to the center of the valve member 66 and are not offset as shown in FIG. 24.

In contrast, the flexural deformation restricting projections 88 are provided on the upper and lower wall surfaces 68A, 68B of the valve housing chamber 68 opposing respectively to the membrane surfaces on both the upper and lower sides of the membrane portion 66B non-uniformly over the circumference. The flexural deformation restricting projections 88 are configured to come into abutment with the membrane portion 66B at least at the time of flexural deformation of the membrane portion 66B to restrict the flexural deformation thereof and, in this example, as shown in FIG. 24(a), the height is set to achieve the abutment with the membrane portion 66B even when the membrane portion 66B is at the neutral position.

A plurality of the flexural deformation restricting projections 88 may be provided at non-uniform disposition pitches over the circumference surrounding the plug portion 66C. However, in this example, one flexural deformation restricting projection 88 is formed at a position on the circumference like a point as shown in FIG. 23. The flexural deformation restricting projections 88 are provided on the upper wall surface 68A and the lower wall surface 68B of the valve housing chamber 68 in vertically symmetry. The flexural deformation restricting projection 88 may be provided on only one of the upper and lower wall surfaces 68A, 68B of the valve housing chamber 68.

In this manner, since the flexural deformation restricting projections 88 are provided on the wall surfaces 68A, 68B of the valve housing chamber 68 non-uniformly on the circumference, the contact of the valve member 66 with the wall surfaces 68A, 68B of the valve housing chamber 68 may be made non-uniform over the circumference at the time of flexural deformation of the valve member 66 as shown in FIG. 24(b). Therefore, as in the fifth embodiment, the abnormal sound level caused by the contact can be reduced. Other configurations and advantages are the same as those in the first embodiment, and description will be omitted.

Other Embodiments

The arrangement, the number, and the shape of the communicating hole 76 and the projection 78 provided on the valve member 66 are not limited to the above-described embodiment, and may be modified variously. For example, although the projections 78 in the embodiments described above are provided on both the upper and lower surfaces of the membrane portion 66B, it may be provided on only one of the surfaces. The projection 78 is not essential in the present invention, and a configuration without the projection 78 is also included in the present invention.

A configuration in which only one of the upper and lower annular projecting portions 82, 84 of the valve member 66 is provided is also applicable. It is also possible to provide the annular projecting portion 82 on one of upper and lower sides around the opening 60C, 60D of the valve housing chamber 68 and the annular projecting portion 84 on the other side at the membrane portion 66B of the valve member 66. When providing the annular projecting portions 84 on both the upper and lower sides, the radially projecting portions 86 may be provided on both of them or may be provided on only one side.

In the embodiments described above, the second auxiliary liquid chamber 52 is provided and the second orifice flow channel 60 is provided so as to communicate between the main liquid chamber 42 and the second auxiliary liquid chamber 52. However, the present invention may be applied also in the case where only the first auxiliary liquid chamber 44 is provided as a auxiliary liquid chamber and the second orifice flow channel 60 is provided so as to communicate between the main liquid chamber 42 and the first auxiliary liquid chamber 44 in the same manner as the first orifice flow channel 56.

Furthermore, in the embodiments described above, the second auxiliary liquid chamber 52 is provided on the side of the first auxiliary liquid chamber 44 of the partitioning member 40, and the second orifice flow channel 60 is provided so as to communicate the main liquid chamber 42 and the second auxiliary liquid chamber 52. Alternatively, however, the second orifice flow channel can be provided so as to communicate between the second auxiliary liquid chamber and the first auxiliary liquid chamber after providing the second auxiliary liquid chamber on the side of the main liquid chamber of the partitioning member to divide off the main liquid chamber using a second diaphragm. In this case, the first flow channel portion of the second orifice flow channel extending in the direction of the thickness of the partitioning member opens toward the first auxiliary liquid chamber and the second flow channel portion thereof extending along the periphery of the second auxiliary liquid chamber is provided on the side of the main liquid chamber of the partitioning member and connected to the second auxiliary liquid chamber.

In this manner, the second orifice flow channel may be configured to communicate the main liquid chamber and any one of the auxiliary liquid chambers, for example, or may be configured to communicate the two auxiliary liquid chambers as long as it communicates the different liquid chambers.

Although the embodiments described above aim at the shaking vibrations and the idling vibrations, the invention is not limited thereto, and may be applied to various vibrations having different frequencies. In addition, various modifications are possible unless departing from the scope of the invention although they are not listed up here.

INDUSTRIAL APPLICABILITY

The present invention may be used for various vibration isolators such as a body mount or a diff mount in addition to the engine mount.

The invention claimed is:

1. A liquid-sealed type vibration isolator comprising:
a first fixture to be fixed to one of a vibration source side and a support side;
a second fixture to be fixed to the other one of the vibration source side and the support side;
a vibration-isolating base member made of an elastomer interposed between the first fixture and the second fixture;
a main liquid chamber having liquid sealed therein and a chamber wall thereof defined partly of the vibration-isolating base member;
at least one auxiliary liquid chamber having liquid sealed therein and a chamber wall thereof defined partly of a diaphragm formed of an elastomeric membrane;
a first orifice flow channel configured to communicate the main liquid chamber and the at least one auxiliary liquid chamber;
a second orifice flow channel tuned to a higher frequency range than the first orifice flow channel and configured to communicate any two of the main liquid chamber and the at least one auxiliary liquid chamber;
a partitioning member configured to partition the main liquid chamber and the at least one auxiliary liquid chamber and formed with the second orifice flow channel; and
a valve member formed of an elastomeric membrane for opening and closing the second orifice flow channel,
wherein the partitioning member includes a valve housing chamber configured to house and hold the valve member in a part of the second orifice flow channel so as to be orthogonal to the direction of flow in the flow channel,
the valve member is held at an outer peripheral portion thereof between wall surfaces of the valve housing chamber, and includes inside the outer peripheral portion thereof a flexible membrane portion configured to be subjected to flexural deformation by the liquid flow in the second orifice flow channel and thereby close an opening of the second orifice flow channel to the valve housing chamber provided in the partitioning member, and
the membrane portion includes a communication hole configured to bring the second orifice flow channel into communication at a position not being overlapped with the opening of the partitioning member to open the second orifice flow channel in a state in which the membrane portion is apart from the opening.

2. The liquid-sealed type vibration isolator according to claim 1, wherein the membrane portion includes a projection provided on a membrane surface thereof at a position not being overlapped with the opening of the partitioning member, and the projection is configured to be compressed to an opposed wall surface of the valve housing chamber by the flexural deformation of the membrane portion.

3. The liquid-sealed type vibration isolator according to claim 2, wherein the communication holes are provided at a plurality of positions on a circumference surrounding a plug portion positioned at the center of the membrane portion, and the projections are provided at a plurality of positions on the circumference alternately with the communication holes.

4. The liquid-sealed type vibration isolator according to claim 2, wherein the projection has a conical shape.

5. The liquid-sealed type vibration isolator according to claim 1, wherein an annular projecting portion is provided on a peripheral edge portion of the opening of the partitioning member or on the membrane portion opposing the peripheral edge portion so as to surround the opening.

6. The liquid-sealed type vibration isolator according to claim 5, wherein the annular projecting portion is provided on the membrane portion and a radially projecting portion extending from the center of the annular projecting portion in the radial direction is provided inside the annular projecting portion.

7. The liquid-sealed type vibration isolator according to claim 5, wherein the membrane portion includes a projection provided on a membrane surface thereof at a position not being overlapped with the opening of the partitioning member, and the projection is configured to be compressed to an opposed wall surface of the valve housing chamber by the flexural deformation of the membrane portion.

8. The liquid-sealed type vibration isolator according to claim 1, wherein the second orifice flow channel is provided so as to communicate the main liquid chamber and the at least one auxiliary liquid chamber.

9. The liquid-sealed type vibration isolator according to claim 1, wherein the at least one auxiliary liquid chamber comprises a first auxiliary liquid chamber which includes a chamber wall defined partly by a first diaphragm attached to the second fixture, and a second auxiliary liquid chamber having a chamber wall defined partly by a second diaphragm provided on the partitioning member,
the partitioning member partitions the main liquid chamber and the first auxiliary liquid chamber,
the first orifice flow channel is provided so as to communicate the main liquid chamber and the first auxiliary liquid chamber, and the second orifice flow channel is provided so as to communicate the second auxiliary liquid chamber and the main liquid chamber or the first auxiliary liquid chamber.

10. The liquid-sealed type vibration isolator according to claim 9, wherein the second auxiliary liquid chamber is provided at the center of the partitioning member,
the second orifice flow channel includes a first flow channel portion extending in the thickness direction of the partitioning member and a second flow channel portion connected to the first flow channel portion and extending along the periphery of the second auxiliary liquid chamber,
the partitioning member includes the valve housing chamber at an intermediary position of the first flow channel portion so as to be orthogonal to the direction of flow in the flow channel portion, and
the valve member is arranged so that the center thereof is deviated from the center of the second auxiliary liquid chamber so that the first flow channel portion is not overlapped with the second auxiliary liquid chamber in the thickness direction of the partitioning member.

11. The liquid-sealed type vibration isolator according to claim 10, wherein the partitioning member is formed into a circular shape in plan view, the valve member is formed into a disk shape, and the valve member is arranged so that the center thereof is deviated from the center of the partitioning member by an extent corresponding to a radius of the valve member or more.

12. The liquid-sealed type vibration isolator according to claim 1, wherein the opening of the partitioning member opposing a membrane surface of at least one of the front and back of the membrane portion is deviated from the center of the valve member.

13. The liquid-sealed type vibration isolator according to claim 12, wherein the membrane portion includes a projection provided on a membrane surface thereof at a position not being overlapped with the opening of the partitioning member, and the projection is configured to be compressed to an opposed wall surface of the valve housing chamber by the flexural deformation of the membrane portion.

14. The liquid-sealed type vibration isolator according to claim 12, wherein the at least one auxiliary liquid chamber comprises the first auxiliary liquid chamber which includes a chamber wall defined partly by a first diaphragm attached to the second fixture, and the second auxiliary liquid chamber having a chamber wall defined partly by a second diaphragm provided on the partitioning member, the partitioning member partitions the main liquid chamber and the first auxiliary liquid chamber, and the second auxiliary liquid chamber partitioned from the first auxiliary liquid chamber by the second diaphragm is provided on the side of the first auxiliary liquid chamber of the partitioning member, and the first orifice flow channel is provided so as to communicate the main liquid chamber and the first auxiliary liquid chamber, and the second orifice flow channel is provided so as to communicate the main liquid chamber and the second auxiliary liquid chamber.

15. The liquid-sealed type vibration isolator according to claim 1, wherein the rigidity of the membrane portion is set to be non-uniform over a circumference surrounding a plug portion positioned at the center of the membrane portion.

16. The liquid-sealed type vibration isolator according to claim 15, wherein the communication holes are arranged at non-uniform intervals at a plurality of positions on the circumference surrounding the plug portion, so that the rigidity of the membrane portion is set to be non-uniform over the circumference.

17. The liquid-sealed type vibration isolator according to claim 15, wherein the membrane portion includes projections provided on a membrane surface thereof at positions not being overlapped with the opening of the partitioning member, the projection is configured to be compressed to an opposed wall surface of the valve housing chamber by the flexural deformation of the membrane portion, and the projections are arranged at non-uniform intervals at a plurality of positions on the circumference surrounding the plug portion so that the rigidity of the membrane portion is set to be non-uniform on the circumference thereof.

18. The liquid-sealed type vibration isolator according to claim 1, wherein flexural deformation restricting projections configured to restrict the flexural deformation by coming into abutment with the membrane portion at least at the time of the flexural deformation of the membrane portion are provided on a wall surface of the valve housing chamber opposing at least one of the membrane surfaces on the front and back sides of the membrane portion non-uniformly on the circumference.

19. The liquid-sealed type vibration isolator according to claim 1, wherein the outer peripheral portion of the valve member is formed to be thicker than the membrane portion, and a ring-shaped restricting projection configured to come into abutment with the inner peripheral surface of the thick outer peripheral portion and restrict inward displacement of the outer peripheral portion is provided on the wall surface of the valve housing chamber.

* * * * *

UNITED STATES PATENT AND TRADEMARK OFFICE
CERTIFICATE OF CORRECTION

PATENT NO.        : 8,678,360 B2                                           Page 1 of 1
APPLICATION NO.   : 13/063651
DATED             : March 25, 2014
INVENTOR(S)       : Yamamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this
Twenty-ninth Day of September, 2015

Michelle K. Lee
*Director of the United States Patent and Trademark Office*